(12) United States Patent
Ishimaru et al.

(10) Patent No.: US 12,187,062 B2
(45) Date of Patent: Jan. 7, 2025

(54) DISPLAY MATERIAL ON WHICH LASER PRINTING HAS BEEN CARRIED OUT AND PACKAGING EMPLOYING SAME

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/919,830

(22) PCT Filed: Apr. 15, 2021

(86) PCT No.: PCT/JP2021/015608
§ 371 (c)(1),
(2) Date: Oct. 19, 2022

(87) PCT Pub. No.: WO2021/215348
PCT Pub. Date: Oct. 28, 2021

(65) Prior Publication Data
US 2023/0191820 A1 Jun. 22, 2023

(30) Foreign Application Priority Data
Apr. 24, 2020 (JP) .................. 2020-077437

(51) Int. Cl.
*B32B 3/10* (2006.01)
*B32B 7/02* (2019.01)
(Continued)

(52) U.S. Cl.
CPC ............ *B41M 5/46* (2013.01); *B32B 7/02* (2013.01); *B32B 27/08* (2013.01); *B32B 27/20* (2013.01);
(Continued)

(58) Field of Classification Search
None
See application file for complete search history.

(56) References Cited

U.S. PATENT DOCUMENTS 7,041,381 B1   5/2006  Rasp et al.
2005/0249938 A1  11/2005  Raupack et al.
(Continued)

FOREIGN PATENT DOCUMENTS

JP   2002-362027   12/2002
JP   2004-216740    8/2004
(Continued)

OTHER PUBLICATIONS

Machine translation of JP2004216740A (Year: 2004).*
(Continued)

*Primary Examiner* — Christopher M Polley
(74) *Attorney, Agent, or Firm* — Wenderoth, Lind & Ponack, L.L.P.

(57) ABSTRACT

[PROBLEM] To provide a packaging and a display material which permit printing in distinct fashion by a laser, and which are of high transparency. [SOLUTION MEANS] A display material having at least one layer permitting printing as a result of laser irradiation, the display material being such that the printing occurs due to change in color caused by the laser irradiation in at least one region of said layer; when a digital microscope is used to carry out cross-sectional observation of said printed region and a nonprinted region, a significant difference in at least any one of RGB values indicating color elements is observed; and thickness of said printed region is not less than 5 μm but not greater than 200 μm.

6 Claims, 2 Drawing Sheets

(51) Int. Cl.
  *B32B 27/08* (2006.01)
  *B32B 27/20* (2006.01)
  *B32B 27/32* (2006.01)
  *B32B 27/36* (2006.01)
  *B41M 5/32* (2006.01)
  *B41M 5/46* (2006.01)

(52) U.S. Cl.
  CPC .............. *B32B 27/32* (2013.01); *B32B 27/36* (2013.01); *B41M 5/32* (2013.01); *B32B 2255/10* (2013.01); *B32B 2255/20* (2013.01); *B32B 2270/00* (2013.01); *B32B 2307/4026* (2013.01); *B32B 2307/414* (2013.01); *B32B 2307/516* (2013.01); *B32B 2307/518* (2013.01); *B32B 2307/542* (2013.01); *B32B 2307/7244* (2013.01); *B32B 2553/00* (2013.01)

(56) References Cited

U.S. PATENT DOCUMENTS

| | | |
|---|---|---|
| 2016/0168399 A1 | 6/2016 | Matoda et al. |
| 2019/0256706 A1 | 8/2019 | Takeda et al. |

FOREIGN PATENT DOCUMENTS

| | | | |
|---|---|---|---|
| JP | 2004216740 A | * | 8/2004 |
| JP | 2004-268554 | | 9/2004 |
| JP | 2005-534535 | | 11/2005 |
| JP | 2010-194757 | | 9/2010 |
| JP | 2013-240885 | | 12/2013 |
| JP | 2015-83623 | | 4/2015 |
| JP | 2017-196896 | | 11/2017 |
| JP | 2017-209847 | | 11/2017 |
| JP | 2019-25754 | | 2/2019 |
| JP | 2020-146962 | | 9/2020 |
| WO | 00/47661 | | 8/2000 |
| WO | 2013/109809 | | 7/2013 |
| WO | 2014/096833 | | 6/2014 |
| WO | 2014/188828 | | 11/2014 |
| WO | 2018/074480 | | 4/2018 |
| WO | 2021/020269 | | 2/2021 |

OTHER PUBLICATIONS

International Search Report (ISR) issued Jun. 22, 2021 in International (PCT) Application No. PCT/JP2021/015608.
International Preliminary Report on Patentability issued Oct. 25, 2022 in International PCT Application No. PCT/JP2021/015608.
Office Action issued Jul. 8, 2024, in corresponding Indonesian Patent Application No. P002022211141, with partial English-language translation.
Extended European Search Report issued Mar. 18, 2024, in corresponding European Patent Application No. 21791961.2.

* cited by examiner

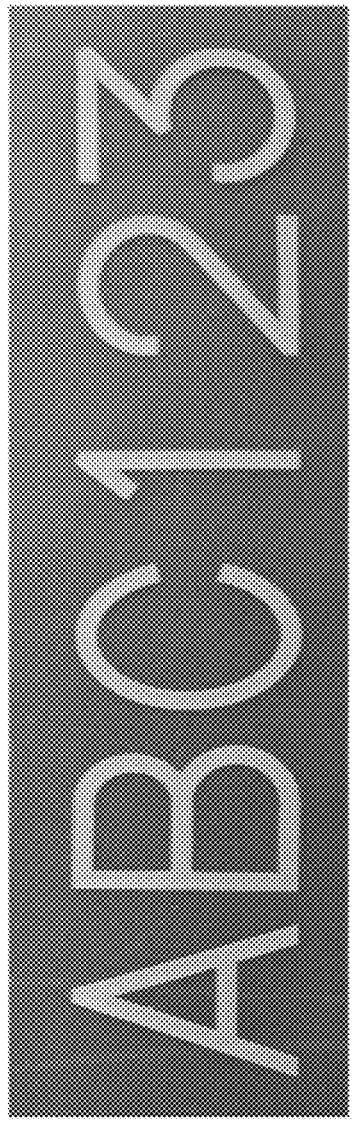
[FIG. 1]

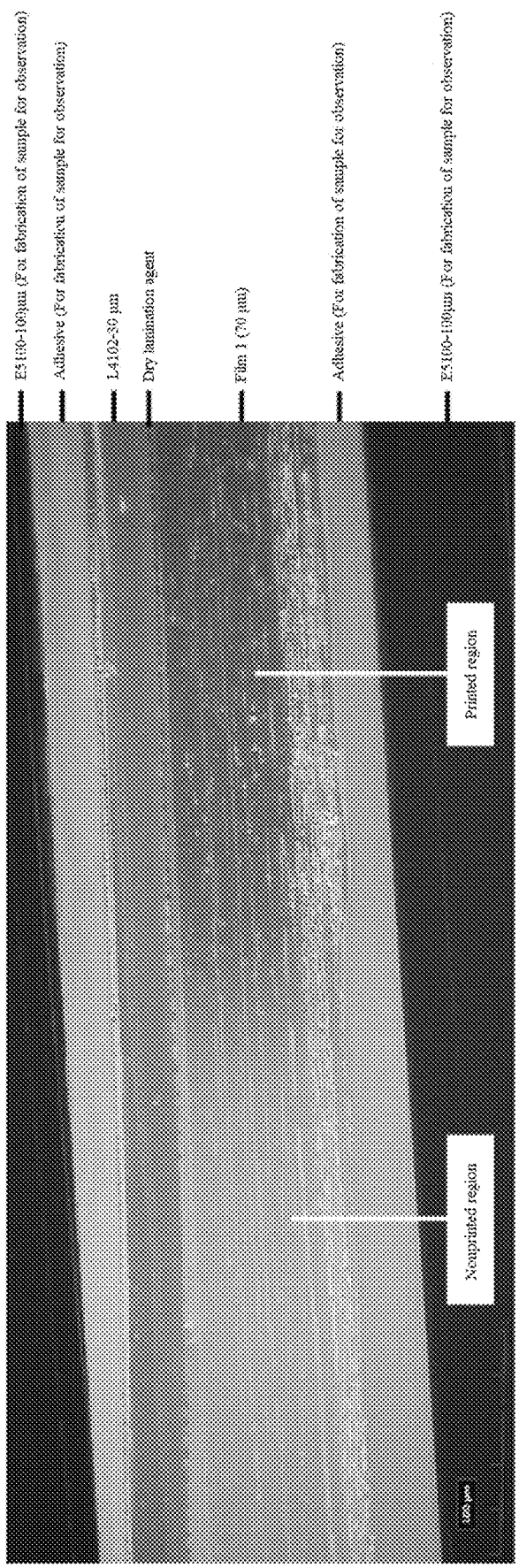

DISPLAY MATERIAL ON WHICH LASER PRINTING HAS BEEN CARRIED OUT AND PACKAGING EMPLOYING SAME

TECHNICAL FIELD

The present invention relates to a display material having printing produced by laser irradiation or other such display thereon and packaging employing same.

BACKGROUND ART

Packaging has conventionally been employed in supply chain goods as typified by foods, pharmaceutical agents, and industrial products. In most cases, this not only protects the contents but also has the role of displaying information pertaining to the product name, manufacturing date, raw materials, and so forth. As means for achieving such display, besides printing employing ink or the like which is conventionally known, labels (tack labels) at which pressure sensitive adhesive is applied on the back surface of a substrate permitting printing by means of thermal transfer or ink as described for example at Patent Reference No. 1 are in wide use. A tack label is such that information is printed in advance on the front surface constituting the display surface thereof, and while in this state is affixed to a release sheet (liner), this being removed from the liner and affixed to the display material during use. After the tack label has been affixed thereto, because the liner no longer serves a purpose, the more labels that are used the greater will be the increase in trash that is produced. Furthermore, as the label user must have labels of differing displayed content in correspondence to the types of contents to which they pertain, management of labels grows increasingly complex as the types of contents increase, and this has brought with it the increased likelihood that a mistake might be made with respect to which label is affixed to what. Moreover, it has normally been necessary to have on hand an excess supply thereof so as to be ready in the event of a shortage, which has meant that when manufacture or sale of the contents to which they pertain is terminated, there being no further use for such labels, it has been the case that they are discarded. Tack labels have thus been besought with various deficiencies.

To eliminate the foregoing problems, Patent Reference No. 2 discloses a heat-sensitive film having a heat-sensitive recording layer. Because the film of Patent Reference No. 2 changes color when affected by heat, the packaging itself has display capability. For this reason, it does not require use of the foregoing tack label. Furthermore, because, during an operation in which a pouch is formed from packaging employing a film such as that at Patent Reference No. 2, it will be possible, by incorporating a thermal printer or other such printing device therein, to cause pouch forming and display to be completed in a single operation, it has also contributed to reduction in labor and reduction in cost. Because of the advantages possessed thereby, techniques in which printing is carried out directly on the packaging itself have recently become popular. However, because when a heat-sensitive layer is provided on a film constituting the substrate there is a possibility that rubbing or the like with the exterior will cause delamination of the heat-sensitive layer, it has normally been the case that a protective layer has been provided over (toward the surface layer from) the heat-sensitive layer. As means for providing such functional layers, coating is widely and commonly employed. Because coating involves passage through at least application, drying, and winding operations, the greater number of functional layers the more operations there will be, causing reduction in productivity. Moreover, because such functional layers have particles, there has also been the problem that transparency has been reduced in correspondence to the thicknesses of the layers.

On the other hand, as display (printing) means, not only techniques in which the heat and ink cited above but also those in which lasers serve as trigger have recently become popular. For example, Patent Reference No. 3 discloses a multilayer laminated film for laser printing in which a printing layer comprises a layer consisting of an ink composition that is capable of being printed by means of laser light. Use of this film makes it possible to cause change in color at locations irradiated by a laser, permitting printing to be carried out. Note, however, that because films such as the film of Patent Reference No. 3—like the film of Patent Reference No. 2—require that a printing layer be provided over the film substrate, problems such as delamination of layers and reduction in productivity remain unsolved.

Furthermore, Patent Reference No. 4 discloses an additive for laser marking that consists of bismuth oxide. Kneading this additive into a plastic makes it possible to cause change in color at regions irradiated by a laser, permitting printing to be carried out. Whereas plastics alone do not normally undergo reaction due to lasers, this additive can be made to undergo excitation by the energy from a laser, making it possible to cause a change in the color of the plastic. Because the additive is disposed at the interior of the film, the fact that the delamination of functional layers which occurred with coatings tends not to occur makes this useful. But because the additive is metal particulate, the problem remains that—like the foregoing coating—this causes reduction in the transparency of the film. Where printing is carried out by laser irradiation, the perception of printing is first made possible when a change in color is made to occur at said regions. However, where the transparency of the plastic constituting the substrate is itself low, it is difficult when carrying out printing by laser irradiation to visually distinguish printed regions from nonprinted regions, which causes it to fail to meet the definition of printing functionality.

PRIOR ART REFERENCES

Patent Documents

Patent Reference No. 1: Japanese Patent Application Publication Kokai No. 2002-362027
Patent Reference No. 2: Japanese Patent Application Publication Kokai No. 2017-209847
Patent Reference No. 3: Japanese Patent Application Publication Kokai No. 2017-196896
Patent Reference No. 4: International Patent Application Publication No. 2014/188828

SUMMARY OF THE INVENTION

Problem to be Solved by Invention

It is an object of the present invention to solve problems of the conventional art such as the foregoing. That is, it is an object of the present invention to provide a packaging and a display material which permit printing in distinct fashion by a laser, and which are of high transparency.

Means for Solving Problem

The present invention is constituted as follows.

1. A display material having at least one layer permitting printing as a result of laser irradiation, the display material being such that the printing occurs due to change in color caused by the laser irradiation in at least one region of said layer; when a digital microscope is used to carry out cross-sectional observation of said printed region and a nonprinted region, a significant difference in at least any one of RGB values indicating color elements is observed; and thickness of said printed region is not less than 5 μm but not greater than 200 μm.

2. Packaging or the display material according to 1. characterized in that thickness of the region in which the change in color occurs due to the laser irradiation is not less than 20 μm but not greater than 140

3. The display material according to 1. or 2. characterized in that not less than 100 ppm but not greater than 3000 ppm of pigment capable of causing the change in color due to the laser irradiation is present within the layer permitting the printing as a result of the laser irradiation.

4. The display material according to any of 1. through 3. characterized in that the pigment permitting the printing as a result of the laser irradiation contains metal, said metal being contained therewithin in the form of at least one species—whether alone or as an oxide—among bismuth, gadolinium, neodymium, titanium, antimony, tin, and aluminum.

5. The display material according to any of 1. through 4. characterized in that haze is not less than 1% but is not greater than 40%.

6. Packaging comprising the display material according to any of 1. through 5.

BENEFIT OF THE INVENTION

A display material and a packaging in accordance with the present invention are of high transparency, and a packaging and a display material permitting printing to be carried out in distinct fashion by a laser are able to be provided thereby.

BRIEF DESCRIPTION OF DRAWINGS

FIG. 1 Image of display at which laser printing has been carried out in accordance with Working Example 1

FIG. 2 Image during cross-sectional observation of display in accordance with Working Example 1

MODES FOR CARRYING OUT THE INVENTION

Below, description is given with respect a display material in accordance with the present invention.

At a display material in accordance with the present invention, it is required that there be at least one layer permitting printing at least by means of laser irradiation (hereinafter sometimes referred to as "laser printing layer").

1. Raw Materials Making Up Laser Printing Layer
1.1. Pigment for Use in Laser Printing At a laser printing layer in which the present invention, pigment having ability to cause the color of a plastic constituting the substrate thereof to change when acted on by laser irradiation (hereinafter sometimes referred to simply as "pigment") must be added thereto. Because the plastic itself will ordinarily have almost no reaction to laser light, it is often the case that it will be incapable of permitting printing by means of laser irradiation. Pigment can be made to undergo excitation by the energy from laser light, and cause carburization of the surrounding resin (preferred conditions for laser irradiation will be described below). Furthermore, besides causing carburization of plastic, there are pigments which, depending on the type thereof, may themselves change color and become black. Such simple or compound alteration of color makes it possible for printing to be carried out at the laser printing layer. Based upon consideration of printing precision, it is preferred that pigment which itself also changes color be used.

As pigment type, any of bismuth, gadolinium, neodymium, titanium, antimony, tin, and aluminum—whether present alone or in oxide form—may be cited. Furthermore, it is preferred that pigment particle diameter be not less than 0.1 μm but not greater than 10 μm. When pigment particle diameter is less than 0.1 μm, there is a possibility that change in color when irradiated by a laser will no longer be adequate. Furthermore, when particle diameter is greater than 10 μm, there is a tendency for haze of the display material to exceed 40%. It is more preferred that particle diameter be not less than 0.5 μm but not greater than 9 μm. As pigments which meet these conditions, "Tomatec Color" (manufactured by Tokan Material Technology Co., Ltd.), "Iriotec (Registered Trademark)" (manufactured by Merck Performance Materials), and so forth are commercially available and may be favorably used.

It is preferred that the amount of pigment added within the laser printing layer be not less than 100 ppm but not greater than 3000 ppm. When the amount of pigment that is added thereto is less than 100 ppm, this is not preferred, because the print density produced by the laser would be inadequate and because a significant difference would tend not to be exhibited in RGB at printed regions and nonprinted regions, as described below. On the other hand, when the amount of pigment that is added thereto exceeds 3000 ppm, this is not preferred because haze of the display material would tend to be greater than 40%. With respect to the effect that addition of pigment has on haze value, this is caused not only by the color of the pigment itself but is also due to scattering of light by pigment particles.

As method for blending pigment within the plastic that makes up the laser printing layer, it might for example be added at any desired step(s) during manufacture of the resin. Furthermore, methods in which a vented kneader extruder is used to cause resin raw material and a slurry in which the particles are dispersed in solvent to be blended, methods in which a kneader extruder is used to cause the dried particles and resin to be blended, and so forth may also be cited. Of these, methods in which a kneader extruder is used to cause the dried particles and plastic to be blended (made into a masterbatch) are preferred.

1.2. Types of Plastic

With regard to the type of plastic that makes up the laser printing layer that is comprised by the present invention, there is no particular limitation with respect thereto, it being possible to make free use thereamong without departing from the gist of the present invention. As the type of plastic, polyester, polyolefin, polyamide, and the like may be cited as examples.

As polyester, polyethylene terephthalate (PET), polybutylene terephthalate (PBT), polyethylene naphthalate (PEN), polytrimethylene terephthalate (PTT), polybutylene naphthalate (PBN), polylactic acid (PLA), polyethylene furanoate (PEF), polybutylene succinate (PBS), and so forth may be cited as examples. Moreover, in addition to the polyesters cited at the foregoing examples, it is also possible to use modified polyesters in which the monomer(s) at such acid site and/or diol site are altered. As acid-site monomer, isophthalic acid, 1,4-cyclohexanedicarboxylic acid, 2,6- naphthalene dicarboxylic acid, orthophthalic acid, and other such aromatic dicarboxylic acids, adipic acid, azelaic acid, sebacic acid, decanedicarboxylic acid, and other such aliphatic dicarboxylic acids, and alicyclic dicarboxylic acids may be cited as examples. Furthermore, as diol-site monomer, neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2,2-di-n-butyl-1,3-propanediol, hexanediol, 1,4-butanediol, and other such long-chain diols, hexanediol and other such aliphatic diols, bisphenol A and other such aromatic-type diols, and so forth may be cited as examples. Moreover, as component making up polyester, this may include polyester elastomer(s) comprising ε-caprolactone, tetramethylene glycol, and/or the like. Regarding the polyester raw materials cited above, it is possible to use raw material in which a plurality of species of homopolyester, each of which has polymerized therein one species of carboxylic acid monomer and one species of diol monomer, are mixed (dry blended); and it is possible to use raw material in which two or more species of carboxylic acid monomer and/or two or more species of diol monomer are copolymerized. Furthermore, it is possible to use raw material in which homopolyester(s) and copolymerized polyester(s) are mixed.

As polyolefin, polypropylene (PP), polyethylene (PE), and so forth may be cited as examples. Where polypropylene is employed, there is no particular limitation with respect to stereoregularity, it being possible for this to be isotactic, syndiotactic, and/or atactic, it being possible for these to be present therein in any desired fractional percentage(s). Furthermore, where polyethylene is employed, there is no particular limitation with respect to the density (degree of branching) thereof, it being possible for this to be high density (HDPE), linear low density (LLDPE), and/or low density (LDPE). Furthermore, besides the foregoing homopolymers, raw materials in which two or more different types of monomers are copolymerized may be used; examples of monomers that may be used for copolymerization which may be cited including ethylene, α-olefins, and so forth; examples of α-olefins which may be cited including propylene, 1-butene, 1-pentene, 1-hexene, 1-heptene, 1-octene, 1-nonene, 1-decene, 4-methyl-1-pentene, 4-methyl-1-hexene, and so forth. The type of copolymerization may be random copolymerization and/or block copolymerization. Moreover, besides the examples of raw materials cited above, polyolefin elastomer and/or ionomer may be employed.

While there is no particular limitation with respect to the melt flow rate (MFR) of polyolefin serving as raw material, it being possible for this be freely chosen as desired, it is preferred that this be 1 g/10 min to 10 g/10 min. When MFR is less than 1 g/10 min, this is not preferred because it would cause the melt viscosity of the raw material to be too high, as a result of which the resin pressure at the time of extruding operation(s) during film formation would be too high, which would tend to cause occurrence of deformation of filter(s) and so forth. On the other hand, when MFR is greater than 10 g/10 min, because this would cause molecular weight to become extremely low, there is a possibility that it would increase the tendency for fracture to occur during film formation, and/or that it would reduce resistance to blocking. It is more preferred that MFR be not less than 2 g/10 min but 8 g/10 min, and still more preferred that this be not less than 3 g/10 min but 7 g/10 min.

As polyamide, any one type of resin—or a raw material mixture in which two or more types thereof are mixed—selected from among polycapramide (nylon 6), polyhexamethylene adipamide (nylon 66), caprolactam/lauryl lactam copolymer (nylon 6/12), caprolactam/hexamethylene diammonium adipate copolymer (nylon 6/66), ethylene ammonium adipate/hexamethylene diammonium adipate/hexamethylene diammonium sebacate copolymer (nylon 6/66/610), polymers of meta-xylylenediamine and adipic acid (MXD-6), hexamethylene isophthalamide/terephthalamide copolymer (amorphous nylon), and so forth may be cited as examples. Furthermore, an adhesion improvement layer may be provided at the surface of a film comprising any of the examples of plastics cited above. As material for the adhesion improvement layer, acrylic, a water-soluble or water-dispersible polyester, a hydrophobic polyester in which acrylic is graft copolymerized, and so forth may be cited as examples.

It is preferred that the lower limit of the range in values for relative viscosity (RV) of polyamide serving as raw material be 2.2, and more preferred that this be 2.3. If the foregoing is less than this, crystallization rate may be too high and biaxial stretching may be difficult. On the other hand, it is preferred that the upper limit of the range in values for the RV of polyamide be 4, and more preferred that this be 3.9. If the foregoing is exceeded, there is a possibility that the load or the like on the extruder will become too high and/or that productivity will decrease. Note that "relative viscosity" in the context of the present invention means the value measured at 25° C. using a solution in which 0.5 g of polymer has been dissolved in 50 ml of 97.5% sulfuric acid.

1.3 Additives Other than Laser Pigment

Any of various additives, e.g., waxes, antioxidants, antistatic agents, crystal nucleating agents, viscosity-lowering agents, thermal stabilizers, colorant pigments, antistaining agents, ultraviolet light absorbers, and/or the like, may be added as necessary within the laser printing layer that is comprised by the display material of the present invention. Furthermore, it is preferred that microparticles serving as lubricant for improving lubricity be added thereto. Any desired microparticles may be chosen. For example, as inorganic-type microparticles, silica, alumina, titanium dioxide, calcium carbonate, kaolin, barium sulfate, and so forth may be cited; as organic-type microparticles, acrylic particles, melamine particles, silicone particles, crosslinked polystyrene particles, and so forth may be cited. Average particle diameter of microparticles when measured by means of a Coulter counter may be chosen as appropriate as needed within the range 0.05 μm to 3.0 μm. It is preferred that the lower limit of the range in values for the fractional amount of microparticles present therein be 0.01 wt %, more preferred that this be 0.015 wt %, and still more preferred that this be 0.02 wt %. Below 0.01 wt %, there can be reduction in lubricity. It is preferred that the upper limit of the range in values be 1 wt %, more preferred that this be 0.2 wt %, and still more preferred that this be 0.1 wt %. Greater than 1 wt % is not preferred, because there can be reduction in transparency.

As method for blending particles within the laser printing layer, these may be added at any desired step(s) during manufacture of the plastic raw material.

1.4. Thickness of Laser Printing Layer

It is preferred that thickness of the laser printing layer be not less than 5 μm but not greater than 5000 μm. When thickness of the laser printing layer is less than 5 μm, this is not preferred, as the print density produced when irradiated by a laser will be reduced, making it difficult to visually perceive lettering. On the other hand, when thickness of the laser printing layer is greater than 5000 μm, this is not preferred because there will be a tendency to exceed 40% haze. It is more preferred that thickness of the laser printing layer be not less than 10 μm but not greater than 2000 μm, and still more preferred that this be not less than 20 μm but not greater than 1000 μm.

2. Layers Other than Laser Printing Layer

As described above, a display material in accordance with the present invention must have at least one laser printing layer as described at "1. Laser Printing Layer". As layered constitution of the display material, this may be such that there is only a single layer in the form of a laser printing layer, or layer(s) other than the laser printing layer may be laminated therewith. Based upon consideration of the fact that, besides display function, mechanical strength, adhesive characteristics, barrier properties, and various other functions will ordinarily be sought in a display material, it is preferred that layer(s) having respective function(s) be laminated therewith. Thereamong, based upon consideration of the fact that the present invention is premised on a packaging, an even more favorable mode will be provided with a layer having adhesive characteristics (hereinafter referred to as "adhesion layer").

2.1. Adhesion Layer

As adhesion layer that may be comprised by a display material in accordance with the present invention, there is no particular limitation with respect thereto so long as it has adhesive characteristics, it being possible to use any among those which are conventionally known without departing from the gist of the present invention. Heat seal layers which are such that adhesive characteristics are made manifest as a result of heat, and pressure sensitive adhesive (tacky) layers which have adhesive characteristics at normal temperature, may be cited as examples.

As the type of plastic that makes up the heat seal layer, polyester, polyolefin, polyamide, and the like may be cited as examples.

As polyester, polyethylene terephthalate (PET), polybutylene terephthalate (PBT), polyethylene naphthalate (PEN), polytrimethylene terephthalate (PTT), polybutylene naphthalate (PBN), polylactic acid (PLA), polyethylene furanoate (PEF), polybutylene succinate (PBS), and so forth may be cited as examples. Moreover, in addition to the polyesters cited at the foregoing examples, it is also possible to use modified polyesters in which the monomer(s) at such acid site and/or diol site are altered. As acid-site monomer, isophthalic acid, 1,4-cyclohexanedicarboxylic acid, 2,6-naphthalene dicarboxylic acid, orthophthalic acid, and other such aromatic dicarboxylic acids, adipic acid, azelaic acid, sebacic acid, decanedicarboxylic acid, and other such aliphatic dicarboxylic acids, and alicyclic dicarboxylic acids may be cited as examples. Furthermore, as diol-site monomer, neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2,2-di-n-butyl-1,3-propanediol, hexanediol, 1,4-butanediol, and other such long-chain diols, hexanediol and other such aliphatic diols, bisphenol A and other such aromatic-type diols, and so forth may be cited as examples. Moreover, as component making up polyester, this may include polyester elastomer(s) comprising ε-caprolactone, tetramethylene glycol, and/or the like. Regarding the polyester raw materials cited above, it is possible to use raw material in which a plurality of species of homopolyester, each of which has polymerized therein one species of carboxylic acid monomer and one species of diol monomer, are mixed (dry blended); and it is possible to use raw material in which two or more species of carboxylic acid monomer and/or two or more species of diol monomer are copolymerized. Furthermore, it is possible to use raw material in which homopolyester(s) and copolymerized polyester(s) are mixed.

As polyolefin, polypropylene (PP), polyethylene (PE), and so forth may be cited as examples. Where polypropylene is employed, there is no particular limitation with respect to stereoregularity, it being possible for this to be isotactic, syndiotactic, and/or atactic, it being possible for these to be present therein in any desired fractional percentage(s). Furthermore, where polyethylene is employed, there is no particular limitation with respect to the density (degree of branching) thereof, it being possible for this to be high density (HDPE), linear low density (LLDPE), and/or low density (LDPE). Furthermore, besides the foregoing homopolymers, raw materials in which two or more different types of monomers are copolymerized may be used; examples of monomers that may be used for copolymerization which may be cited including ethylene, α-olefins, and so forth; examples of α-olefins which may be cited including propylene, 1-butene, 1-pentene, 1-hexene, 1-heptene, 1-octene, 1-nonene, 1-decene, 4-methyl-1-pentene, 4-methyl-1-hexene, and so forth. The type of copolymerization may be random copolymerization and/or block copolymerization. Moreover, besides the examples of raw materials cited above, polyolefin elastomer and/or ionomer may be employed.

While there is no particular limitation with respect to the melt flow rate (MFR) of polyolefin serving as raw material, it being possible for this be freely chosen as desired, it is preferred that this be 1 g/10 min to 10 g/10 min. When MFR is less than 1 g/10 min, this is not preferred because it would cause the melt viscosity of the raw material to be too high, as a result of which the resin pressure at the time of extruding operation(s) during film formation would be too high, which would tend to cause occurrence of deformation of filter(s) and so forth. On the other hand, when MFR is greater than 10 g/10 min, because this would cause molecular weight to become extremely low, there is a possibility that it would increase the tendency for fracture to occur during film formation, and/or that it would reduce resistance to blocking. It is more preferred that MFR be not less than 2 g/10 min but 8 g/10 min, and still more preferred that this be not less than 3 g/10 min but 7 g/10 min.

As polyamide, any one type of resin—or a raw material mixture in which two or more types thereof are mixed—selected from among polycapramide (nylon 6), polyhexamethylene adipamide (nylon 66), caprolactam/lauryl lactam copolymer (nylon 6/12), caprolactam/hexamethylene diammonium adipate copolymer (nylon 6/66), ethylene ammonium adipate/hexamethylene diammonium adipate/hexamethylene diammonium sebacate copolymer (nylon 6/66/610), polymers of meta-xylylenediamine and adipic acid (MXD-6), hexamethylene isophthalamide/terephthalamide copolymer (amorphous nylon), and so forth may be cited as examples. Furthermore, an adhesion improvement layer may be provided at the surface of a film comprising any of the examples of plastics cited above. As material for the adhesion improvement layer, acrylic, a water-soluble or water-dispersible polyester, a hydrophobic polyester in which acrylic is graft copolymerized, and so forth may be cited as examples.

It is preferred that the lower limit of the range in values for relative viscosity (RV) of polyamide serving as raw material be 2.2, and more preferred that this be 2.3. If the foregoing is less than this, crystallization rate may be too high and biaxial stretching may be difficult. On the other hand, it is preferred that the upper limit of the range in values for the RV of polyamide be 4, and more preferred that this be 3.9. If the foregoing is exceeded, there is a possibility that the load or the like on the extruder will become too high and/or that productivity will decrease. Note that "relative viscosity" in the context of the present invention means the value measured at 25° C. using a solution in which 0.5 g of polymer has been dissolved in 50 ml of 97.5% sulfuric acid.

As the type of plastic that makes up the pressure sensitive adhesive layer, polyester, polyolefin, polystyrene, acrylic, and the like may be cited as examples, those having a glass transition temperature Tg which is below room temperature (in the vicinity of 25° C.) being particularly preferred.

As examples of polyester, as monomer(s) that will permit Tg to be lowered, it is preferred that saturated carboxyl acid component and/or saturated diol component be used. As saturated carboxyl acid, adipic acid, azelaic acid, sebacic acid, decanedicarboxylic acid, 1,4-cyclohexanedicarboxylic acid, and so forth may be cited. Thereamong, adipic acid and azelaic acid are preferred. As saturated diol component, ethylene glycol, diethylene glycol, 1,3-propanediol, 2,2-diethyl-1,3-propanediol, 1,4-butanediol, and other such long-chain diols, and hexanediol and other such aliphatic diols may be cited. Thereamong, use of diethylene glycol, 1,3-propanediol, and/or 1,4-butanediol is preferred. Moreover, as component making up polyester-type resin, polyester elastomer(s) comprising ε-caprolactone, tetramethylene glycol, and/or the like may be used. Polyester elastomer may be favorably used because it is effective in lowering Tg.

As polyolefinic substances, polyolefinic elastomers may be cited as examples. As polyolefinic elastomers, ethylene-propylene copolymer, ethylene-1-butene copolymer, ethylene-1-hexene copolymer, ethylene-1-octene copolymer, ethylene-4-methyl-1-pentene copolymer, ethylene-propylene-1-butene copolymer, ethylene-propylene-1-hexene copolymer, ethylene-1-butene-1-hexene copolymer, propylene-1-butene copolymer, propylene-1-hexene copolymer, propylene-1-octene copolymer, propylene-4-methyl-1-pentene copolymer, propylene-1-butene-1-hexene copolymer, propylene-1-butene-4-methyl-1-pentene copolymer, and so forth may be cited as examples. Furthermore, small amount(s) of SBS, SEBS, and/or other such styrenic elastomer(s) may be added thereto.

As polystyrenes, polystyrenic elastomers may be cited as examples. As polystyrenic elastomers, polymers in which an aromatic alkenyl compound and a conjugated diene have been block copolymerized may be cited as examples; examples of aromatic alkenyl compounds which may be cited including styrene, tert-butyl styrene, α-methylstyrene, p-methyl styrene, p-ethyl styrene, divinylbenzene, 1,1-diphenylethylene, vinylnaphthalene, vinylanthracene, N,N-dimethyl-p-aminoethylstyrene, N,N-diethyl-p-aminoethylstyrene, vinylpyridine, and so forth; examples of conjugated diene monomers which may be cited including 1,3-butadiene, 1,2-butadiene, isoprene, 2,3-dimethyl-butadiene, 1,3-pentadiene, 2-methyl-1,3-butadiene, 2-methyl-1,3-pentadiene, 1,3-hexadiene, 1,3-cyclohexadiene, 4,5-diethyl-1,3-octadiene, 3-butyl-1,3-octadiene, myrcene, chloroprene, and other such diolefins.

Acrylic may be a copolymer of acrylic monomer or a copolymer of acrylic monomer and a monomer other than that which is capable of being copolymerized. As acrylic monomer, such copolymer may be derived from monomers, examples of which that may be cited including (meth) acrylate, methyl (meth)acrylate, ethyl (meth)acrylate, propyl (meth)acrylate, isopropyl acrylate, n-butyl (meth)acrylate, isobutyl acrylate, t-butyl (meth)acrylate, n-amyl (meth)acrylate, isoamyl (meth)acrylate, n-hexyl (meth)acrylate, 2-ethylhexyl (meth)acrylate, n-octyl (meth)acrylate, decyl (meth) acrylate, octadecyl (meth)acrylate, lauryl (meth)acrylate, stearyl (meth)acrylate, and other such (meth)acrylic acid alkyl esters; cyclohexyl (meth)acrylate, benzyl (meth)acrylate, phenyl (meth)acrylate, and other such (meth)acrylic acid cyclic esters; allyl (meth)acrylate, 1-methylallyl (meth) acrylate, 2-methylallyl (meth)acrylate, and other such vinyl (meth)acrylates and other such unsaturated-group-containing (meth)acrylic acid esters; glycidyl (meth)acrylate, (3,4-epoxycyclohexyl)methyl (meth)acrylate, and other such heterocycle-containing (meth)acrylic acid esters; N-methylaminoethyl (meth)acrylate, N-tributylaminoethyl (meth)acrylate, N,N-dimethylaminoethyl (meth)acrylate, and other such amino-group containing (meth)acrylic acid esters; 3-methacryloxypropyltrimethoxysilane and other such alkoxysilyl-group-containing (meth)acrylic acid esters; methoxyethyl (meth)acrylate, ethylene oxide adduct of (meth)acrylic acid, and other such (meth)acrylic acid derivatives; perfluoroethyl (meth)acrylate, perfluorobutyl (meth) acrylate, and other such (meth)acrylic acid perfluoroalkyl esters; trimethylolpropane tri(meth)acrylate and other such polyfunctional (meth)acrylic acid esters; and so forth. Furthermore, as monomers other than acrylic that are capable of being copolymerized, as monomers having at least one carboxyl group at a radical polymerizable unsaturated group, maleic acid, maleic anhydride, itaconic acid, itaconic anhydride, and so forth may be cited as examples. Furthermore, besides radical polymerizable unsaturated groups, as monomers having at least one hydroxyl group, 2-hydroxyethyl (meth)acrylate, 2-hydroxypropyl (meth)acrylate, 2-hydroxybutyl (meth)acrylate, diethylene glycol mono(meth) acrylate, and so forth may be cited as examples. Moreover, as vinyl monomers and the like which are capable of copolymerization with acrylic monomer, styrene, α-styrene, and other such aromatic vinyl-type monomers; vinyltrimethoxysilane and other such trialkyloxysilyl-group-containing vinyl monomers; acrylonitrile, methacrylonitrile, and other such nitrile-group-containing vinyl-type monomers; acrylamide- and methacrylamide-group-containing vinyl-type monomers; vinyl acetate, vinyl versatate, and other such vinyl esters and so forth may be cited as examples.

Using plastic of any of the types described above by way of example as raw material, this may be used as desired as film formed so as to be unstretched, uniaxially stretched, or biaxially stretched, or as a coating in which this is dispersed in solvent or the like. Where this is formed into film, it is preferred for achievement of adhesive characteristics that this be unstretched or uniaxially stretched, unstretched being more preferred.

2.2. Gas Barrier Layer

In addition to the foregoing layered constitution, gas barrier layer(s) may be provided. By causing gas barrier layer(s) to be present thereat, it is possible to improve the gas barrier properties of the display material and to improve the shelf life of the contents. It is preferred that the gas barrier layer be constituted from inorganic thin film(s) in which the primary constituent is metal or metal oxide, there being no objection regardless of whether this is disposed at surfacemost layer(s) or at intermediate layer(s). It is moreover preferred that the gas barrier layer be transparent. In addition to the foregoing gas barrier which is composed of inorganic thin film, the present invention may moreover have an anchor coat layer which is provided below the inorganic thin film layer (between the inorganic thin film and the plastic film) and/or an overcoat layer which is provided above the inorganic thin film. By causing such layer(s) to be present thereat, it is possible to anticipate improvement in closeness of contact with gas barrier layer(s), improvement in gas barrier properties, and so forth.

2.2.1. Gas Barrier Layer Raw Material Type and Composition

There being no particular limitation with respect to gas barrier layer raw material type, conventionally known materials may be used, it being possible to select therefrom as appropriate in accordance with the object in question to satisfy the desired gas barrier characteristics and/or the like. As gas barrier layer raw material type, silicon, aluminum, tin, zinc, iron, manganese, and other such metals, inorganic compounds comprising one or more of such metals, corresponding inorganic compounds in the form of oxides, nitrides, carbides, fluorides, and so forth may be cited as examples. Any of such inorganic substances and/or inorganic compounds may be used alone, or a plurality thereof may be used. In particular, where silicon oxide (SiOx) or aluminum oxide (AlOx) is used alone (one-member set), or these are used in combination (two-member set), this will be preferred because it will make it possible to achieve improved transparency in the context of the display material or packaging comprising barrier layer(s). Where the inorganic compound component consists of a two-member set in the form of silicon oxide and aluminum oxide, it is preferred that aluminum oxide be present therein in an amount that is not less than 20 mass % but not greater than 80 mass %, and it is more preferred that this be not less than 25 mass % but not greater than 70 mass %. When the amount of aluminum oxide that is present therein is 20 mass % or less, this is not preferred because there is a possibility that it would cause reduction in gas barrier layer density and worsening of gas barrier characteristics. Furthermore, when the amount of aluminum oxide that is present therein is 80 mass % or greater, this is not preferred because gas barrier layer flexibility would tend to be reduced and cracking would tend to occur, and there is a possibility as a result that worsening of gas barrier characteristics could occur.

When the oxygen/metal element ratio of the metal oxide used in the gas barrier layer is not less than 1.3 but less than 1.8, this is preferred because there will be less variation in gas barrier characteristics, making it possible to always obtain excellent gas barrier characteristics. The oxygen/metal element ratio may be determined by using x-ray photoelectron spectroscopy (XPS) to measure the respective elemental amounts of oxygen and metal, and calculating the oxygen/metal element ratio.

2.2.2. Gas Barrier Layer Formation Method

There being no particular limitation with respect to the gas barrier layer formation method, known manufacturing methods may be employed so long as they do not impair the object of the present invention. Among known methods, employment of vapor deposition is preferred. As vapor deposition method, vacuum deposition, sputtering, ion plating, and other such PVD (physical vapor deposition) methods, CVD (chemical vapor deposition) methods, and so forth may be cited as examples. Of these, vacuum deposition and physical vapor deposition are preferred, vacuum deposition being particularly preferred from the standpoints of manufacturing speed and stability. As heating technique during vacuum deposition, resistive heating, high-frequency inductive heating, electron beam heating, and/or the like may be employed. Furthermore, reactive deposition may be employed in which reactive gas(es) in the form of oxygen, nitrogen, water vapor, and/or the like are introduced, and/or in which ozone addition is carried out, this is ion assisted, and/or other such means are employed. Furthermore, imparting of a bias or the like to the substrate, causing substrate temperature to be increased or cooled, and/or other such changes may be made to film formation conditions so long as they do not impair the object of the present invention.

A gas barrier layer formation method employing vacuum deposition is described below. During gas barrier layer formation, the display material or packaging of the present invention is transported by way of metal rollers to gas barrier layer manufacturing apparatus(es). By way of example, a gas barrier layer manufacturing apparatus might be constituted so as to comprise unwinding roller(s), coating drum(s), takeup roller(s), electron beam gun(s), crucible(s), and vacuum pump(s). The display material or packaging might be mounted on the unwinding roller, be made to undergo processing at the coating drum, and be wound by the takeup roller. The display material or packaging web (within the gas barrier layer manufacturing apparatus) would be subjected to vacuum produced by the vacuum pump, inorganic material placed within the crucible would be evaporated by the beam emitted from the electron gun and vapor deposited onto the display material or packaging which is made to undergo processing at the coating drum. During vapor deposition of inorganic material, heat is produced at the display material or packaging, and tension is moreover applied thereto between the unwinding roller and the takeup roller. If the temperature at the display material or packaging is too high, not only will thermal shrinkage of the display material or packaging be large, but because softening will be promoted thereby, it will also be the case that the tension will tend to cause occurrence of tensile deformations. Moreover, this is also not preferred because after emerging from the vapor deposition operation the temperature drop (cooling) experienced by the display material or packaging would be large, the amount of shrinkage (different from thermal shrinkage) following expansion would be large, causing occurrence of cracking at the gas barrier layer and making it difficult to achieve the desired gas barrier characteristics. On the other hand, while the lower the temperature at the display material or packaging the more preferred this would be because it would permit suppression of deformation of the display material or packaging, because it would cause reduction in gas barrier layer thickness due to a decrease in the amount of evaporated inorganic material, there is a concern that this could make it impossible to satisfy the desired gas barrier characteristics. It is preferred that the temperature at the display material or packaging be not less than 100° C. but not greater than 180° C., more preferred that this be not less than 110° C. but not greater than 170° C., and still more preferred that this be not less than 120° C. but not greater than 160° C.

It is preferred that a gas barrier layer laminated body thus provided be such that the water vapor permeability thereof under conditions of temperature 40° C. and relative humidity 90% RH be not less than 0.05 [g/(m²·d)] but not greater than 4 [g/(m²·d)]. When water vapor permeability is greater than 4 [g/(m²·d)], this is not preferred because when used as packaging to contain contents the shelf life of the contents would be reduced. On the other hand, whereas a water vapor permeability of less than 0.05 [g/(m²·d)] would be preferred because it would enhance gas barrier properties and increase the shelf life of the contents, the current level of the art is such that the lower limit of the range in values therefor is 0.05 [g/(m²·d)]. As a practical matter it is fair to say that it will be adequate even where the lower limit of the range in values for the water vapor permeability is 0.05 [g/(m²·d)]. It is preferred that the upper limit of the range in values for the water vapor permeability thereof be 3.8 [g/(m²·d)], and more preferred that this be 3.6 [g/(m²·d)].

In addition, it is preferred that a gas barrier layer laminated body employing the film of the present invention be such that the oxygen permeability thereof under conditions of temperature 23° C. and relative humidity 65% RH be not less than 0.05 [cc/(m²·d·atm)] but not greater than 4 [cc/(m²·d·atm)]. When oxygen permeability is greater than 4 [cc/(m²·d·atm)], this is not preferred because the shelf life of the contents would be reduced. On the other hand, whereas an oxygen permeability of less than 0.05 [cc/(m²·d·atm)] would be preferred because it would enhance gas barrier properties and increase the shelf life of the contents, the current level of the art is such that an oxygen permeability of 0.05 [cc/(m²·d·atm)] is the lower limit of the range in values therefor. As a practical matter it is fair to say that it will be adequate even where the lower limit of the range in values for the oxygen permeability is 0.05 [cc/(m²·d·atm)]. It is preferred that the upper limit of the range in values for the oxygen permeability thereof be 3.8 [cc/(m²·d·atm)], and more preferred that this be 3.6 [cc/(m²·d·atm)].

2.3. Overcoat Layer

The gas barrier laminated body employing the display material of the present invention (these collectively being referred to as "display material" in the present section) may, with the object of further improvement in gas barrier properties, abrasion resistance, and/or the like, also comprise overcoat layer(s) over gas barrier layer(s) formed as described by way of example at the foregoing "2.2. Gas Barrier Layer."

2.3.1. Overcoat Layer Type

There being no particular limitation with respect to overcoat layer type, compositions comprising urethane-based resin(s) and silane coupling agent(s), compounds comprising organosilicon(s) and hydrolysate(s) thereof, water-soluble macromolecules having hydroxyl group(s) and/or carboxyl group(s), and other such conventionally known materials may be used, it being possible to select therefrom as appropriate in accordance with the object in question to satisfy the desired gas barrier characteristics and/or the like.

Furthermore, to the extent that it does not impair the object of the present invention, one or more of various types of additives may be added to the overcoat layer with the object of imparting it with antistatic properties, ultraviolet absorbing properties, coloration, thermal stability, lubricity, and/or the like, it being possible for the type(s) and added amount(s) of the respective additive(s) to be chosen as appropriate in correspondence to the desired object(s).

2.3.2. Overcoat Layer Formation Method

During overcoat layer formation, the substrate display material or packaging is transported by way of metal rollers to coating equipment. As examples of how the equipment might be constituted, unwinding roller(s), coating operation(s), drying operation(s), and takeup operation(s) may be cited. During overcoating, a laminated body mounted on an unwinding roller might, by way of metal rollers, be made to pass through a coating operation and a drying operation, and to ultimately be guided to a takeup roller. There being no particular limitation with respect to coating method, gravure coating, reverse coating, dipping, low coating, air knife coating, comma coating, screen printing, spray coating, gravure offsetting, die coating, bar coating, and/or other such conventionally known methods may be employed, it being possible to select therefrom as appropriate in accordance with the desired object. Of these, gravure coating, reverse coating, and bar coating are preferred from the standpoint of productivity. As drying method, any one, or any combination of two or more, of hot air drying, hot roll drying, high-frequency irradiation, infrared radiation, UV irradiation, and other such heating methods may be employed.

At the drying operation, the substrate display material or packaging is heated, and tension is moreover applied thereto between metal rollers. If the temperature to which the substrate display material or packaging is heated during the drying operation is too high, not only will thermal shrinkage of the substrate display material or packaging be large, but because softening will be promoted thereby, it will also be the case that the tension will tend to cause occurrence of tensile deformations, and there will tend to be occurrence of cracking at the gas barrier layer of the substrate display material or packaging. Moreover, this is also not preferred because after emerging from the drying operation the temperature drop (cooling) experienced by the laminated body would be large, and the amount of shrinkage (different from thermal shrinkage) following expansion would also be large by a corresponding amount, causing occurrence of cracking at the gas barrier layer and at the overcoat layer, and making it difficult to satisfy the desired gas barrier characteristics. On the other hand, while the lower the temperature to which the substrate display material or packaging is heated the more preferred this would be because it would permit suppression of deformation of the substrate display material or packaging, because the solvent of the liquid coating would tend not to dry, there is a concern that this could make it impossible to satisfy the desired gas barrier characteristics. It is preferred that the temperature to which the substrate display material or packaging is heated be not less than 60° C. but not greater than 200° C., more preferred that this be not less than 80° C. but not greater than 180° C., and still more preferred that this be not less than 100° C. but not greater than 160° C.

2.4. Other Layers

To cause the printing characteristics and/or lubricity of surface(s) thereof to be made satisfactory, it is possible for the display material of the present invention to be made to comprise layer(s) that have undergone corona treatment, coating treatment, flame treatment, and/or the like, it being possible for same to be comprised thereby as desired without departing from the requirements of the present invention.

Furthermore, with the goal of improving the design characteristics thereof, the display material of the present invention may be provided with lettering and/or pictorial content other than that which is printed by means of laser. As material for constituting such lettering and/or pictorial content, gravure ink, flexographic ink, and/or other such known substance(s) may be used. Regarding the number of printing layer(s), there may be one such layer or there may be a plurality of such layers. So as to be able to improve design characteristics by printing a plurality of colors, it is preferred that there be printing layer(s) that comprise a plurality of layers. There will be no objection regardless of whether printing layer(s) are disposed at surfacemost layer(s) or at intermediate layer(s).

3. Display Material Properties 3.1. Printed Region 3.1.1. RGB Values

A laser printing layer making up a display material in accordance with the present invention must be such that, when cross-sectional observation is carried out using a digital microscope, a significant difference in at least any one of the RGB values which indicate color elements is exhibited between a printed region and a nonprinted region. RGB values are values which designate colors, R indicating red, G indicating green, and B indicating blue. RGB values can respectively take on values from 0 to 255, a color being determined based on the combination of these values. Here, where it is said that "a significant difference is exhibited," this indicates that when RGB values at 10 arbitrary points (n=10) in each a printed region and a nonprinted region from the same image are acquired and a 95% confidence interval (1.96 times the standard error) is calculated, there is no overlap between the upper limit of the one and the lower limit of the other; i.e., the difference between the two is greater than zero. Cross-sectional observation method and 95% confidence interval calculation method are as described below at the Working Examples. Where a significant difference in any one of the RGB values is exhibited between a printed region and a nonprinted region, this will make clear visual recognition of printing possible. It is preferred that the number of values in which a significant difference is exhibited be two, and more preferred that this be all three (i.e., R, G, and B). It is preferred that the difference in the upper and lower limits with a 95% confidence interval for the RGB values be not less than 5, more preferred that this be not less than 10, and still more preferred that this be not less than 15.

3.1.2. Thickness

A laser printing layer making up a display material in accordance with the present invention must be such that, when cross-sectional observation is carried out using a digital microscope, thickness of a region at which laser printing has been carried out is not less than 5 µm but not greater than 200 µm. The greater the thickness of the region at which laser printing has been carried out in such fashion as to cause there to be a significant difference in the aforementioned RGB values, the greater will be the extent to which print density is visually amplified. When said thickness is less than 5 µm, it will be difficult to visually recognize printing even where there is a significant difference in the aforementioned RGB values. On the other hand, when said thickness is 200 µm or greater, while this might be thought to be preferred were one to only consider that print density will be amplified thereby, it is nonetheless not preferred because haze in nonprinted regions would tend to be greater than 40%, which would make it difficult to visually distinguish printing. It is preferred that thickness of the region at which laser printing has been carried out be not less than 10 µm but not greater than 180 µm, more preferred that this be not less than 15 µm but not greater than 160 µm, and particularly preferred that this be not less than 20 µm but not greater than 140 µm.

3.2. Nonprinted Region (All Layers)

3.2.1. Haze

It is preferred that haze at the nonprinted region including all layers of the display material of the present invention be not less than 1% but not greater than 40%. When haze is greater than 40%, this is not preferred, because it will cause the display material to lose transparency, resulting in deterioration in ability to visually perceive contents. In contradistinction to alteration of color by conventionally disclosed art employing mere laser marking, because the display material of the present invention requires that printing produced by laser irradiation be readable, it requires a high degree of definiteness. It is more preferred that haze be not greater than 35%, and still more preferred that this be not greater than 30%. On the other hand, whereas a low haze value is preferred in that the lower this is the more improved the transparency will be, the level of the art of the present invention is such that the lower limit of the range in values therefor is 1%, and as a practical matter it will be adequate even where the lower limit of the range in values therefor is 2%.

3.2.2. L* Value

It is preferred that the L* value, which indicates color, at the nonprinted region including all layers of the display material of the present invention be not less than 70 but not greater than 95. The L* value is an indication of lightness, the higher the value the greater the lightness. When the L* value is less than 70, this is not preferred, because it will cause the display material to exhibit dull color tone, causing it to appear less visually attractive. As per the content of the foregoing description given with respect to haze, because the display material of the present invention requires that printing produced by laser irradiation be readable, it requires a high degree of definiteness. It is more preferred that the L* value be not less than 70.5, and still more preferred that this be not less than 71. On the other hand, the level of the art of the present invention is such that the upper limit of the range in values for the L* value is 95, and as a practical matter it will be adequate even where the upper limit of the range in values therefor is 94.5.

3.2.3. Thickness

It is preferred that total thickness of all layers of the display material of the present invention be not less than 8 µm but not greater than 5000 µm. If total thickness of all layers is less than 8 µm, this is not preferred because it would cause handling characteristics to worsen, and would make handling difficult during printing or other such secondary treatment. On the other hand, while there would be no objection were total thickness of all layers to be greater than 5000 µm, this is not preferred, not only because it would cause haze of the display material to tend to be greater than 40% but also because it would cause the weight used to increase and would cause increase in chemical cost. It is more preferred that total thickness of all layers be not less than 13 µm but not greater than 4500 µm, and still more preferred that this be not less than 18 µm but not greater than 4000 µm.

4. Laser Printing Layer Manufacturing Conditions 4.1. Mixture and Supply of Raw Materials In manufacturing the display material of the present invention, as described above at "1. Laser Printing Layer", pigment permitting printing when acted on by laser irradiation must be present in the laser printing layer. Because it is preferred that pigment be used in masterbatch form, it will ordinarily be the case that two or more species of raw material will be mixed. It has conventionally been the case that causing two or more species of raw material to be mixed and fed to an extruder has produced variation (segregation) in the supply of raw materials, and has resulted in occurrence of a problem whereby this has caused variation in RGB values to increase, and has made it difficult to differentiate laser printed regions from nonprinted regions. That is, because variation in supply of raw materials has caused increase in confidence intervals (described below) for RGB values, this has increased the tendency for there to be overlap between confidence intervals for RGB values at printed regions and nonprinted regions. To prevent this and to achieve narrower confidence intervals for RGB values and facilitate differentiation of colors, it is preferred that agitator(s) be installed at hopper(s) and plumbing directly above extruder(s) and that melt extrusion be carried out after raw materials have been uniformly mixed.

4.2. Melt Extrusion

The display material and/or packaging of the present invention may be obtained by causing the raw materials described at the foregoing "1. Laser Printing Layer" to be supplied to an extruder in accordance with the method described at the foregoing "4.1. Mixture and Supply of Raw Materials", causing the raw materials to be melt extruded by the extruder to form unstretched film, and carrying out stretching thereof in accordance with a prescribed method as described below. Note that where the film comprises laser printing layer(s) and other layer(s), there will be no objection regardless of whether the timing with which the respective layers are laminated is such that this is carried out before or after stretching. Where lamination is carried out before stretching, it is preferred that a method be adopted in which the resins serving as raw materials for the respective layers are melt extruded at respectively different extruders, and a feedblock or the like is used partway along the resin flow paths to achieve joining thereof. Where lamination is carried out after stretching, it is preferred that lamination in which respectively separately formed films are affixed to each other by means of adhesive and/or extruded lamination in which molten plastic is made to flow and be laminated to surface layer(s) of laminated and/or single film(s) be adopted. From the standpoint of productivity, methods in which the respective layers are laminated before stretching is carried out are preferred.

As method for melt extruding resin raw material, known methods may be employed, methods employing extruder(s) equipped with barrel(s) and screw(s) being preferred. It is preferred that a hopper dryer, paddle dryer, or other such dryer and/or vacuum dryer be used in advance to cause raw material (polyester or the like) that might otherwise decompose due to the effect of moisture when molten to be dried until the moisture content thereof is not greater than 100 ppm, more preferably not greater than 90 ppm, and still more preferably not greater than 80 ppm. After the raw material has been dried in such fashion, the resin that has been melted by extruder(s) is quenched, as a result of which it is possible to obtain unstretched film. With respect to extrusion, this may be carried out by adopting the T die method, tubular method, and/or any other such known method as desired.

Furthermore, a high shear rate when resin is expelled from the region of the die orifice is preferred because this will permit reduction in unevenness in thickness in the transverse direction of the film (especially in the region of maximum concavity). This is because a high shear rate will stabilize the pressure at the time that resin is expelled from the T die outlet. It is preferred that shear rate be not less than 100 sec$^{-1}$, even more preferred that this be not less than 150 sec$^{-1}$, and particularly preferred that this be not less than 170 sec$^{-1}$. A high draft ratio is preferred in that this will cause unevenness in thickness in the machine direction to be satisfactory, but too high a draft ratio is not preferred because this would cause debris from resin and so forth to adhere to the region at which resin is expelled from the die, decreasing productivity. The shear rate at the die outlet may be determined from Formula 1, below.

$$\gamma = 6Q/(W \times H^2) \quad \text{Formula 1}$$

γ=Shear rate (sec$^{-1}$)
Q=Amount of raw material expelled from extruder (cm$^3$/sec)
W=Width of opening at die outlet (cm)
H=Length of opening at die outlet (lip gap) (cm)

By thereafter quenching the film that is molten due to having been extruded, it is possible to obtain unstretched film. As method for quenching molten resin, a method on which the molten resin from the orifice fixture is cast onto a rotating drum where it is quenched and allowed to solidify to obtain a substantially unoriented resin sheet might be favorably adopted.

The film that would become a laser printing layer may be formed in accordance with any of the following techniques: unstretched; uniaxially stretched (stretching in at least one of either the vertical (machine) direction or the horizontal (transverse) direction); biaxially stretched. From the standpoints of mechanical strength and productivity, uniaxial stretching is preferred, and biaxial stretching is more preferred. While the description that follows is given with a focus on the sequential biaxial stretching method employing machine direction stretching—transverse direction stretching in which stretching is first carried out in the machine direction and stretching is subsequently carried out in the transverse direction, there is no objection to transverse direction stretching—machine direction stretching in which the order is reversed, as this will merely cause a change in the principal orientation direction. There would moreover be no objection to the simultaneous biaxial stretching method in which stretching in the machine direction and transverse direction are carried out simultaneously.

4.3. First (Machine Direction) Stretching

Stretching in the first direction (vertical or machine direction) may be carried out by causing the film to be fed into a machine direction stretching device in which a plurality of groups of rollers are arranged in continuous fashion. In carrying out machine direction stretching, it is preferred that preheating roller(s) be used to carry out preheating of the film. The preheating temperature is set so as to be between glass transition temperature Tg and melting point Tm+50° C., as determined based on the Tg of the plastic that makes up the film. When the preheating temperature is less than Tg, this is not preferred because stretching will be difficult at the time that stretching in the machine direction is carried out, and there will be a tendency for fracture to occur. And when the heating temperature is higher than Tm+50° C., this is not preferred because the film will tend to stick to the rollers, and there will be a tendency for the film to become wound thereabout.

When film reaches between Tg and Tm+50° C., stretching in the machine direction is carried out. The stretching ratio in the machine direction should be not less than 1× but not greater than 5×. As 1× would mean that there is no stretching in the machine direction, the stretching ratio in the machine direction should be 1× to obtain film which is uniaxially stretched in the transverse direction, and the stretching ratio in the machine direction should be not less than 1.1× to obtain biaxially stretched film. Because causing the stretching ratio in the machine direction to be not less than 1.1× will make it possible impart the film with molecular orientation in the machine direction and increase mechanical strength, this is preferred. While there is no objection to employment of any value as the upper limit of the range in values for the stretching ratio in the machine direction, as too great a stretching ratio in the machine direction will increase the tendency for fracture to occur during the stretching in the transverse direction that follows, it is preferred that this be not greater than 10×. It is more preferred that the stretching ratio in the machine direction be not less than 1.2× but not greater than 9.8×, and still more preferred that this be not less than 1.4× but not greater than 9.6×.

4.4. Second (Transverse Direction) Stretching

Following first (machine direction) stretching, it is preferred that stretching in the transverse direction be carried out at a stretching ratio of on the order of 2× to 13× at between Tg and Tm+50° C. while in a state such that the two ends in the transverse direction (the direction perpendicular to the machine direction) of the film are gripped by clips within a tenter. Before carrying out stretching in the transverse direction, it is preferred that preheating be carried out, in which case preheating should be carried out until the temperature at the display material or packaging surface reaches between Tg and Tm+50° C.

It is more preferred that the stretching ratio in the transverse direction be not less than 2.2× but not greater than 12.8×, and still more preferred that this be not less than 2.4× but not greater than 12.6×. Note that because the stretching rates are different for stretching in the machine direction versus stretching in the transverse direction (the stretching rate is higher for stretching in the machine direction), the preferred stretching ratio ranges are different.

Following stretching in the transverse direction, it is preferred that the film be made to pass through an intermediate zone in which no procedure such as would cause it to be actively heated is performed. Relative to the zone in which stretching in the transverse direction is carried out at the tenter, because the temperature at the final heat treatment zone that follow is high, failure to establish an intermediate zone would cause heat (hot air itself and/or radiated heat) from the final heat treatment zone to flow into the operation at which stretching in the transverse direction is carried out. If this were to happen, because the temperature in the zone in which stretching in the transverse direction is carried out would not be stable, there would be occurrence of variation in physical properties. It is therefore preferred that following stretching in the transverse direction the film be made to pass through an intermediate zone until a prescribed time has elapsed before final heat treatment is performed. In this intermediate zone, it is important to block hot air from the final heat treatment zone and from the zone in which stretching in the transverse direction is carried out as well as any concomitant flow that would otherwise accompany movement of the film so that it becomes that rectangular strips come to hang down from above in almost perfectly vertical fashion while the film is not passing therethrough when those strips have been made to hang down from above. It will be sufficient if the time of passage through the intermediate zone is on the order of 1 second to 5 seconds. When the time is less than 1 second, length of time in the intermediate zone will be insufficient, and there will be inadequate heat blocking effect. On the other hand, while longer times in the intermediate zone are preferred, because too long a time therein would result in increased equipment size, on the order of 5 seconds will be sufficient.

4.5. Heat Treatment

Following passage through the intermediate zone, it is preferred at the heat treatment zone that heat treatment be carried out at between Tg and Tm+150° C. Because heat treatment promotes crystallization of the film, not only is it possible to reduce any thermal shrinkage that occurred during stretching operation(s), but this will also tend to increase tensile fracture strength. When heat treatment temperature is less than Tg, this is not preferred because it would tend to increase the thermal shrinkage of the film. On the other hand, when heat treatment temperature exceeds Tm+150° C., this is not preferred because haze would tend to be greater than 40%. It is more preferred that the heat treatment temperature be between Tg+10° C. and Tm+140° C., and still more preferred that this be between Tg+20° C. and Tm+130° C.

It is preferred that the time of passage through the heat treatment zone be not less than 2 seconds but not greater than 20 seconds. When the time of passage therethrough is 2 seconds or less, heat treatment will be meaningless because the film will pass through the heat treatment zone without the surface temperature of the film having reached the temperature setpoint. Because the longer the time of passage therethrough the greater will be the effect of heat treatment, it is more preferred that this be not less than 5 seconds. But because attempting to increase the length of time of passage therethrough would result in increased equipment size, as a practical matter it will be adequate if this is not greater than 20 seconds.

During heat treatment, decreasing the distance between tenter clips (causing relaxation in the transverse direction) by some desired ratio will make it possible to reduce thermal shrinkage in the transverse direction. For this reason, it is preferred during final heat treatment that the film be made to undergo relaxation in the transverse direction within the range not less than 0% but not greater than 10% (a percent relaxation of 0% indicating that the film is not made to undergo relaxation). Whereas the higher the percent relaxation in the transverse direction the greater will be the reduction in shrinkage in the transverse direction, as the upper limit of the range in values for the percent relaxation (shrinkage of film in the transverse direction immediately following stretching in the transverse direction) is determined by the raw materials used, the conditions under which stretching in the transverse direction was carried out, and the heat treatment temperature, it will not be possible to cause the film to undergo relaxation to the point where this would be exceeded. At a laser printing layer making up a display material in accordance with the present invention, the upper limit of the range in values for the percent relaxation in the transverse direction is 10%. Furthermore, during heat treatment, it is also possible to decrease the distance between clips in the machine direction by some desired ratio (to cause relaxation in the machine direction).

4.6. Cooling

Following passage through the heat treatment zone, it is preferred at the cooling zone that a cooling airstream at not less than 10° C. but not greater than 30° C. be used to carry out cooling of the film for a passage time therethrough of not less than 2 seconds but not greater than 20 seconds.

By thereafter causing the film to be rolled up as portions cut from the two ends thereof are removed therefrom, a film roll is obtained.

5. Display Material Lamination and Pouch Forming Method 5.1 Method of Laminating Laser Printing Layer and Other Layer(s)

When manufacturing a display material in accordance with the present invention, there being no particular limitation with respect to the method by which laser printing layer(s) and "layer(s) other than laser printing layer(s)" at Section 2., above, are laminated, adjacent films may be made to mutually adhere through use of conventionally known dry lamination and/or extruded lamination. Where dry lamination is employed, commercially available adhesives for dry lamination may be used. Representative examples include Dicdry (registered trademark) LX-703VL manufactured by DIC Corporation; KR-90 manufactured by DIC Corporation; Takenate (registered trademark) A-4 manufactured by Mitsui Chemicals, Inc.; Takelac (registered trademark) A-905 manufactured by Mitsui Chemicals, Inc.; and so forth. Where extruded lamination is employed, plastic that will constitute a layer other than a laser printing layer is made to melt and adhere between layers or between a layer and another layer, it being preferred that an anchor coat layer also be laminated thereat so as to increase adhesion at surface(s) of layer(s) and/or the like.

5.2. Display Material Pouch Forming Method

The display material of the present invention (referred to in the present Section as "display material of the present invention," including a laminated body comprising gas barrier layer(s) as described by way of example at "2.2. Gas Barrier Layer" and/or a laminated body comprising overcoat layer(s) as described by way of example at "2.3. Overcoat Layer" may be favorably used as packaging having printing. As packaging, vertical pillow pouches, horizontal pillow pouches, gusseted pouches, and other such pouches manufactured through use of heat sealing, weld pouches manufactured through use of weld seals, and so forth may be cited as examples. Furthermore, for adhesion thereof, hot-melt or other such adhesives may be employed. Moreover, packaging also includes lid members for plastic containers and labels for bottles which are formed in cylindrical fashion through use of center seals accomplished by means of solvents. Note that it is sufficient that at least a portion of the packaging be made up of the display material of the present invention.

6. Laser Types

As the type (wavelength) of laser, $CO_2$ lasers (10600 nm), YAG lasers (1064 nm), $YVO_4$ lasers (1064 nm), fiber lasers (1090 nm), green lasers (532 nm), and UV lasers (355 nm) may be cited. Thereamong, while there is no particular limitation with respect to the type of laser employed at the display material of the present invention, $CO_2$ lasers being often used for ablation of plastic, as they are often used for a purpose that is different from printing which is the intention of the present invention, they are not preferred as a laser source. As laser source, YAG lasers, $YVO_4$ lasers, fiber lasers, green lasers, and UV lasers are preferred, YAG lasers, fiber lasers, and UV lasers being more preferred. Commercially available devices may be used for laser printing, representative examples of which that may be cited including the LM-2550 (YAG laser) manufactured by Brother Industrial Printing, Ltd.; the MX-Z2000H-V1 (fiber laser) manufactured by Omron Corporation; the MD-U1000 (UV laser) manufactured by Keyence Corporation; and so forth.

Packaging having the packaging or display material of the present invention may be favorably used as packaging or display material for foods, pharmaceutical agents, industrial products, and various other such goods.

WORKING EXAMPLES

Next, although the present invention is described below in more specific terms by way of working examples and comparative examples, the present invention is not to be limited in any way by the modes employed in such working examples, it being possible for changes to be made as appropriate without departing from the gist of the present invention.

Preparation of Polyester Raw Material

SYNTHESIS EXAMPLE

Dicarboxylic acid component in the form of 100 mol % dimethyl terephthalate (DMT) and polyhydric alcohol component in the form of 100 mol % ethylene glycol (EG) were loaded into a stainless steel autoclave equipped with an agitator, thermometer, and partial reflux condenser in such amounts as to cause the molar ratio of ethylene glycol to dimethyl terephthalate to be 2.2×, and 0.05 mol % (as measured as a fraction of the acid component) zinc acetate was used as transesterification catalyst to carry out the transesterification reaction while any methanol generated was distilled off from the system. Thereafter, polycondensation catalyst in the form of 0.225 mol % (as measured as a fraction of the acid component) antimony trioxide was added thereto, and the polycondensation reaction was carried out under vacuum conditions at 26.7 Pa and 280° C. to obtain Polyester A having an intrinsic viscosity of 0.75 dl/g. Note that this Polyester A was ethylene terephthalate. The composition of Polyester A is shown in TABLE 1.

Mixture Example 1

Polyester A obtained at the foregoing Synthesis Example and "Tomatec Color 42-920A (Primary Constituent $Bi_2O_3$)" laser pigment (manufactured by Tokan Material Technology Co., Ltd.) were mixed (dry blended) in a 95:5 wt % ratio, and this was fed into a screw-type extruder, where it was heated at 275° C. and melt blended. This molten resin was expelled with cylindrical shape in continuous fashion from a strand die, this being cut at a strand cutter to obtain chip-like Polyester B (masterbatch). Note that the intrinsic viscosity IV of Polyester B was 0.72 dL/g. The composition of Polyester B is shown in TABLE 1.

Mixture Example 2

Polyester A and "Iriotec (Registered Trademark) 8825 (Primary Constituents Sn and Sb)" laser pigment (manufactured by Merck Performance Materials) were mixed (dry blended) in a 95:5 wt % ratio, and a method similar to that at Mixture Example 1 was employed to obtain Polyester C (masterbatch). Note that the intrinsic viscosity IV of Polyester C was 0.72 dL/g. The composition of Polyester C is shown in TABLE 1.

Mixture Example 3

"Silysia (Registered Trademark) 266 ($SiO_2$)" lubricant (manufactured by Fuji Silysia Chemical Ltd.) was mixed (dry blended) with Polyester A in sufficient amount to obtain a concentration of 7000 ppm therein, and a method similar to that at Mixture Example 1 was employed to obtain Polyester D (masterbatch). Note that the intrinsic viscosity IV of Polyester D was 0.72 dL/g. The composition of Polyester D is shown in TABLE 1.

Preparation of Polyolefin Raw Material
Polyolefin A

As Polyolefin A, Sumitomo Noblen (registered trademark) FS2011DG3 (polypropylene (PP) manufactured by Sumitomo Chemical Co., Ltd.) was used.

Mixture Example 4

The foregoing Polyolefin A and "Tomatec Color 42-920A (Primary Constituent $Bi_2O_3$)" laser pigment (manufactured by Tokan Material Technology Co., Ltd.) were mixed (dry blended) in a 95:5 wt % ratio, and this was fed into a screw-type extruder, where it was melt blended. This molten resin was expelled with cylindrical shape in continuous fashion from a strand die, this being cut at a strand cutter to obtain chip-like Polyolefin B.

Mixture Example 5

The foregoing Polyolefin A and "Iriotec (Registered Trademark) 8825" laser pigment (manufactured by Merck Performance Materials) were mixed (dry blended) in a 95:5 wt % ratio, and a method similar to that at Mixture Example 1 was employed to obtain Polyolefin C.

TABLE 1

| Raw material | Resin | | Additive | |
|---|---|---|---|---|
| | Type • brand name | Amount added | Brand name (type) | Amount added |
| Polyester A | PET | 100 wt % | — | — |
| Polyester B | PET | 95 wt % | TOMATEC COLOR 42-920A | 5 wt % |
| Polyester C | PET | 95 wt % | Iriotec ® 8825 | 5 wt % |
| Polyester D | PET | 99.3 wt % | Silysia ® 266 $SiO_2$ | 7000 ppm |
| Polyolefin A | FS2011DG3 | 100 wt % | — | — |
| Polyolefin B | FS2011DG3 | 95 wt % | TOMATEC COLOR 42-920A | 5 wt % |
| Polyolefin C | FS2011DG3 | 95 wt % | Iriotec ®8825 | 5 wt % |

FILM FABRICATION EXAMPLES

Film 1

Polyester A and Polyester B were mixed in a 97:3 wt % ratio as raw material for the laser printing layer (A); Polyester A and Polyester D were mixed in a 95:5 wt % ratio as raw material for the other layers (Layer B).

The raw materials mixed for Layer A and Layer B were respectively fed into different screw-type extruders, and Layer A and Layer B were each melted at 285° C. and were extruded from a T die at a shear rate of 280 $sec^{-1}$. Note that agitators were attached directly above extruders, the mixed raw materials being fed into the extruders as they were made to undergo agitation by means of these agitators. A feedblock was used partway along the flow paths of the respective molten resins so as to cause them to be joined, and this was expelled from a T die and cooled on a chill roller, the surface temperature of which was set to 30° C., to obtain unstretched film. Molten resin flow paths were established so as to cause the laminated film to be such that the central layer thereof was Layer A, and the two surfacemost layers thereof were Layer B (i.e., a B/A/B constitution in which there were three layers of two species), the amounts expelled therefrom being adjusted so as to cause the thickness ratio of Layer A and Layer B to be 90/10 (B/A/B=5/90/5).

The cooled and solidified unstretched laminated film which was obtained was guided to a machine direction stretching device in which a plurality of groups of rollers were arranged in continuous fashion, this was made to undergo preheating on preheating rollers until the film temperature reached 90° C., following which this was stretched by a factor of 3.4×.

Following machine direction stretching, the film was guided to a transverse direction stretching device (tenter), where it was made to undergo preheating for 5 seconds until the surface temperature thereof reached 115° C., following which it was stretched by a factor of 3.8× in the transverse direction (horizontal direction). Following transverse direction stretching, the film was guided while still in that state to an intermediate zone, being made to pass therethrough in 1.0 second. In the intermediate zone of the tenter, note that hot air from the heat treatment zone and from the zone in which stretching in the transverse direction was carried out were blocked so that it became that rectangular strips came to hang down from above in almost perfectly vertical fashion while the film was not passing therethrough when those strips had been made to hang down from above.

Thereafter, following passage through the intermediate zone, the film was guided to the heat treatment zone, where heat treatment was carried out for 7 seconds at 220° C. At this time, at the same time that heat treatment was being carried out, the distance between clips in the transverse direction of the film was reduced, causing this to undergo 3% relaxation treatment in the transverse direction. Following passage through the final heat treatment zone, the film was cooled for 5 seconds in a cooling airstream at 30° C. Portions were cut and removed from the two edges thereof and this was rolled up into a roll 400 mm in width to continuously manufacture a prescribed length of biaxially stretched film of thickness 70 μm. Manufacturing conditions are shown in TABLE 2.

Films 2 and 3

In similar fashion as at Film 1, raw material mixing conditions, expelling conditions, machine direction stretching temperature, machine direction stretching ratio, transverse direction stretching temperature, transverse direction stretching ratio, and heat treatment temperature were variously altered to continuously form films at Films 2 and 3. Manufacturing conditions for the respective films are shown in TABLE 2.

Film 4

For Film 4, raw material in which Polyester A and Polyester D were mixed in a 95:5 mass % ratio was fed into a screw-type extruder, where it was melted at 285° C. and extruded from a T die at a shear rate of 280 $sec^{-1}$. As was the case with Film 1, for Film 4 as well, agitators were attached directly above extruders, the mixed raw materials being fed into the extruders as they were made to undergo agitation by means of these agitators. The molten resin extruded therefrom was cooled on a chill roller, the surface temperature of which was set to 30° C., to obtain unstretched film.

The unstretched film that was obtained was made to undergo machine direction stretching, transverse direction stretching, and heat treatment under similar conditions as at Film 1, and this was rolled up into a roll 400 mm in width to continuously manufacture a prescribed length of biaxially stretched film of thickness 12 μm.

A gas barrier layer was laminated to one face of this film roll to continuously fabricate a gas barrier laminated body and obtain a roll. More specifically, aluminum was used as vapor deposition source, vacuum deposition being employed to cause aluminum oxide (AlOx) to be laminated to one face of the film as oxygen gas was introduced into the vapor deposition apparatus. Note that thickness of the gas barrier layer was 10 nm. An overcoat layer was thereafter continuously fabricated on the face of the gas barrier laminated body roll that was obtained at which the gas barrier layer was present to obtain a roll. More specifically, a solution in which tetraethoxysilane hydrolysate solution and polyvinyl alcohol had been mixed in a 50:50 ratio was continuously applied thereto, and this was thereafter guided to a drying oven set to a temperature of 120° C. and an airspeed of 15 m/sec to continuously form the overcoat layer thereon. Note that thickness of the overcoat layer was 300 nm. Manufacturing conditions for the laminated body which was obtained are shown in TABLE 2.

Film 5

Polyolefin A and Polyolefin B were mixed in a 97:3 mass % ratio as raw material for the laser printing layer (Layer A); Polyolefin A was used alone (100%) as raw material for the other layers (Layer B).

The raw materials mixed for Layer A and Layer B were respectively fed into different screw-type extruders, and Layer A and Layer B were each melted at 250° C. and were extruded from a T die at a shear rate of 280 sec⁻¹. As was the case with Film 1, for Film 5 as well, agitators were attached directly above extruders, the mixed raw materials being fed into the extruders as they were made to undergo agitation by means of these agitators. A feedblock was used partway along the flow paths of the respective molten resins so as to cause them to be joined, and this was expelled from a T die and cooled on a chill roller, the surface temperature of which was set to 30° C., to obtain unstretched laminated film. Molten resin flow paths were established so as to cause the laminated film to be such that the central layer thereof was Layer A, and the two surfacemost layers thereof were Layer B (i.e., a B/A/B constitution in which there were three layers of two species), the amounts expelled therefrom being adjusted so as to cause the thickness ratio of Layer A and Layer B to be 90/10 (B/A/B=5/90/5).

In similar fashion as at Film 1, machine direction stretching temperature, machine direction stretching ratio, transverse direction stretching temperature, transverse direction stretching ratio, and heat treatment temperature were variously altered to continuously form film from the cooled and solidified unstretched laminated film which was obtained. Manufacturing conditions are shown in TABLE 2.

Films 6 and 7

In similar fashion as at Film 5, raw material mixing conditions, expelling conditions, machine direction stretching temperature, transverse direction stretching temperature, and transverse direction stretching ratio were variously altered to continuously form films at Films 6 and 7. Manufacturing conditions are shown in TABLE 2. Note that Film 7 was film that did not contain laser printing pigment.

Film 8

Polyester A and Polyester B were mixed in a 97:3 wt % ratio as raw material for the laser printing layer (A); Polyester A and Polyester D were mixed in a 95:5 wt % ratio as raw material for the other layers (Layer B).

The raw materials mixed for Layer A and Layer B were respectively fed into different screw-type extruders that did not have agitators, and Layer A and Layer B were each melted at 285° C. and were extruded from a T die at a shear rate of 80 sec⁻¹. A feedblock was used partway along the flow paths of the respective molten resins so as to cause them to be joined, and this was expelled from a T die and cooled on a chill roller, the surface temperature of which was set to 30° C., to obtain unstretched film. Molten resin flow paths were established so as to cause the laminated film to be such that the central layer thereof was Layer A, and the two surfacemost layers thereof were Layer B (i.e., a B/A/B constitution in which there were three layers of two species), the amounts expelled therefrom being adjusted so as to cause the thickness ratio of Layer A and Layer B to be 90/10 (B/A/B=5/90/5).

In similar fashion as at Film 1, machine direction stretching temperature, machine direction stretching ratio, transverse direction stretching temperature, transverse direction stretching ratio, and heat treatment temperature were variously altered to continuously form film from the cooled and solidified unstretched laminated film which was obtained. Manufacturing conditions are shown in TABLE 2.

Film 9

Lix Film (registered trademark) L4102-30 μm manufactured by Toyobo Co., Ltd., was used as Film 9.

TABLE 2

| | | | Film 1 | Film 2 | Film 3 | Film 4 | Film 5 |
|---|---|---|---|---|---|---|---|
| Manufacturing conditions | Raw material composition at laser printing layer (Layer A) [mass %] | Polyester A | 97 | 95 | 95 | 95 | 0 |
| | | Polyester B | 3 | 0 | 5 | 0 | 0 |
| | | Polyester C | 0 | 5 | 0 | 0 | 0 |
| | | Polyester D | 0 | 0 | 0 | 5 | 0 |
| | | Polyolefin A | 0 | 0 | 0 | 0 | 97 |
| | | Polyolefin B | 0 | 0 | 0 | 0 | 3 |
| | | Polyolefin C | 0 | 0 | 0 | 0 | 0 |
| | Raw material composition at layers (Layer B) other than layer A [mass %] | Polyester A | 95 | 95 | 95 | — | 0 |
| | | Polyester B | 0 | 0 | 0 | — | 0 |
| | | Polyester C | 0 | 0 | 0 | — | 0 |
| | | Polyester D | 5 | 5 | 5 | — | 0 |
| | | Polyolefin A | 0 | 0 | 0 | — | 100 |
| | | Polyolefin B | 0 | 0 | 0 | — | 0 |
| | | Polyolefin C | 0 | 0 | 0 | — | 0 |
| | Amount of laser pigment added at Layer A [wt %] | | 0.15 | 0.25 | 0.25 | 0.00 | 0.15 |
| | Agitator used directly above extruder? | | Yes | Yes | Yes | Yes | Yes |
| | Extrusion shear rate [sec⁻¹] | | 280 | 280 | 280 | 200 | 280 |
| | Layered constitution | | B/A/B | B/A/B | B/A/B | A | B/A/B |
| | Relative thicknesses of respective layers (Layer B/Layer A/Layer B) [%] | | 5/90/5 | 5/90/5 | 5/90/5 | 100 | 5/90/5 |
| | Stretching in machine direction (vertical stretching) | Stretching temperature [° C.] | 90 | 100 | 95 | 90 | 155 |
| | | Stretching ratio | 3.4 | 3.2 | 3.5 | 3.5 | 4.5 |
| | Stretching in transverse direction (horizontal stretching) | Stretching temperature [° C.] | 115 | 120 | 110 | 110 | 125 |
| | | Stretching ratio | 3.8 | 3.7 | 4.1 | 4.1 | 8.2 |
| | Heat treatment | Temperature [° C.] | 220 | 230 | 220 | 220 | 165 |
| | | Percent relaxation (transverse direction) | 3 | 3 | 3 | 3 | 7 |
| | Gas barrier layer | Type | — | — | — | AlOx | — |
| | | Thickness [nm] | — | — | — | 10 | — |
| | Overcoat layer | Thickness [nm] | — | — | — | 300 | — |
| Film | laser printing pigment | Metal species | Bi | Sn, Sb | Bi | — | Bi |
| | | Amount [ppm] | 1500 | 400 | 2500 | — | 1500 |
| | Thickness [μm] | Laser printing layer (Layer A) | 63 | 108 | 18 | — | 27 |
| | | All layers | 70 | 120 | 20 | 12 | 30 |

| | | | Film 6 | Film 7 | Film 8 | Film 9 |
|---|---|---|---|---|---|---|
| Manufacturing conditions | Raw material composition at laser printing layer (Layer A) [mass %] | Polyester A | 0 | 0 | 97 | L4102 |
| | | Polyester B | 0 | 0 | 3 | –30 μm |

TABLE 2-continued

| | | | | | |
|---|---|---|---|---|---|
| | | Polyester C | 0 | 0 | 0 |
| | | Polyester D | 0 | 0 | 0 |
| | | Polyolefin A | 97 | 100 | 0 |
| | | Polyolefin B | 0 | 0 | 0 |
| | | Polyolefin C | 3 | 0 | 0 |
| | Raw material composition at layers (Layer B) other than layer A [mass %] | Polyester A | 0 | — | 95 |
| | | Polyester B | 0 | — | 0 |
| | | Polyester C | 0 | — | 0 |
| | | Polyester D | 0 | — | 5 |
| | | Polyolefin A | 100 | — | 0 |
| | | Polyolefin B | 0 | — | 0 |
| | | Polyolefin C | 0 | — | 0 |
| | Amount of laser pigment added at Layer A [wt %] | | 0.15 | 0.00 | 0.15 |
| | Agitator used directly above extruder? | | Yes | Yes | No |
| | Extrusion shear rate [sec⁻¹] | | 440 | 280 | 80 |
| | Layered constitution | | B/A/B | A | B/A/B |
| | Relative thicknesses of respective layers (Layer B/Layer A/Layer B) [%] | | 5/90/5 | 100 | 5/90/5 |
| | Stretching in machine direction (vertical stretching) | Stretching temperature [° C.] | 160 | 155 | 95 |
| | | Stretching ratio | 4.5 | 4.5 | 3.5 |
| | Stretching in transverse direction (horizontal stretching) | Stretching temperature [° C.] | 135 | 125 | 110 |
| | | Stretching ratio | 8.0 | 8.2 | 4.1 |
| | Heat treatment | Temperature [° C.] | 165 | 165 | 220 |
| | | Percent relaxation (transverse direction) | 7 | 7 | 3 |
| | Gas barrier layer | Type | — | — | — |
| | | Thickness [nm] | — | — | — |
| | Overcoat layer | Thickness [nm] | — | — | — |
| Film | laser printing pigment | Metal species | Bi | — | Bi |
| | | Amount [ppm] | 1500 | — | 1600 |
| | Thickness [μm] | Laser printing layer (Layer A) | 54 | — | 18 |
| | | All layers | 60 | 30 | 20 |

DISPLAY MATERIAL FABRICATION EXAMPLES

Working Example 1

An adhesive for dry lamination (Takelac (registered trademark) A-950 manufactured by Mitsui Chemicals, Inc.) was used to laminate Film 1 and Film 9 to fabricate display material.

In order to fabricate a display, the display material which that was obtained was irradiated with a laser to print the characters "ABC123". A 355 nm-wavelength ultraviolet (UV) laser marker (MD-U1000; manufactured by Keyence Corporation) was used as printing apparatus, laser irradiation being carried out at conditions of laser power 40%, scan speed 1000 mm/second, pulse frequency 40 kHz, and spot variability −20. Physical properties of the display which was obtained are shown in TABLE 3.

Working Examples 2-5 and Comparative Examples 1-3

In similar fashion as at Working Example 1, the various films were laminated to fabricate display materials, and laser printing was carried out to fabricate displays. Physical properties of the displays which were obtained are shown in TABLE 3. Note that the laser printing layer of Comparative Example 2 was such that two layers of Film 2 were laminated thereat (thickness 240 μm).

Display Material Evaluation Methods

Display material evaluation methods were as follows. Measurement samples were respectively cut from the printed region and nonprinted region of the display material.

Thickness

One 5 m×5 cm sample was cut from the nonprinted region. A micrometer was used to measure thickness of this sample at 10 different locations, and the average thickness (μm) was calculated.

Type and Amount of Laser Printing Pigment Contained in Laser Printing Layer

Quantitative Measurement of Amounts of Nd, Bi, Sb, Sn, and P

A 0.1 g amount of sample was accurately weighed in a Teflon container of a microwave sample digestion system (Multiwavepro; manufactured by Anton Paar), 6 mL of concentrated nitric acid was added to this, the special-purpose lid was placed thereon and this was inserted in the outer vessel therefor and was placed in the device. This was subjected to heated processing for 60 minutes at what was ultimately 200° C. in the device. This was thereafter allowed to cool to room temperature, the processed solution was placed in a 50 mL digitube, and the Teflon container as it existed following processing was while being washed with ultrapure water placed in same tube, this being treated as a 50 mL fixed volume thereof to prepare the measurement sample. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be B (mg/L), and taking the concentration of the element in the blank test solution (measurement blank) to be C (mg/L), Formula 2, below, was used to determine the amount of the metallic element in 0.1 g of sample.

$$A=(B-C)\times 50/0.1 \quad \text{Formula 2}$$

Quantitative Measurement of Amounts of Other Metallic Elements

A 0.1 g amount of sample was accurately weighed in a crucible made of platinum, and this was precarburized to 400° C. on a hotplate. A Model No. F0610 Electric Furnace manufactured by Yamato Scientific Co., Ltd., was thereafter used to carry out ashing processing for 8 hours at 550° C.

Following ashing processing, 3 mL of 6.0 N hydrochloric acid was added thereto, this was subjected to acidic decomposition at 100° C. on a hotplate, heated processing being carried out until the hydrochloric acid had been completely volatilized. Following completion of acidic decomposition, 20 mL of 1.2 N hydrochloric acid was used to obtain a fixed volume thereof. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be B (mg/L), and taking the concentration of the element in the blank test solution (measurement blank) to be C (mg/L), Formula 3, below, was used to determine the amount of the metallic element in 0.1 g of sample.

$$A=(B-C)\times 20/0.1 \quad \text{Formula 3}$$

Haze

One 5 m×5 cm sample was cut from the nonprinted region. Measurement was carried out using a hazemeter (300A; manufactured by Nippon Denshoku Industries Co., Ltd.) in accordance with JIS-K-7136. Measurements were carried out twice, and the average thereof was determined.

Color L* Value

One 5 m×5 cm sample was cut from the nonprinted region. A spectroscopic color difference meter (ZE-6000; manufactured by Nippon Denshoku Industries Co., Ltd.) was used in reflection mode to measure the color (L* value and b* value) of a single display material or packaging sample.

Water Vapor Permeability

Water vapor permeability was measured in accordance with the method at JIS K7126B. A water vapor permeability measurement apparatus (Permatran-W3/33MG; manufactured by Mocon) was used to measure water vapor permeability of a hygrostatic gas passing therethrough in the direction from the heat seal layer side at an ambient humidity of 90% RH and a temperature of 40° C. Note that prior to measurement the moisture content of the sample was adjusted by allowing it to stand for 4 hours in a 65% RH humidity environment.

Oxygen Permeability

Oxygen permeability was measured in accordance with the method at JIS K7126-2. An oxygen permeability measurement apparatus (Ox-Tran 2/20; manufactured by Mocon) was used to measure oxygen permeability of oxygen passing therethrough in the direction from the heat seal layer side at an ambient humidity of 65% RH and a temperature of 23° C. Note that prior to measurement the moisture content of the sample was adjusted by allowing it to stand for 4 hours in a 65% RH humidity environment.

Evaluation of Printing

Evaluation by Visual Inspection

Characters in the region at which laser printing was carried out were judged based on the following criteria.

GOOD Characters were recognizable as a result of visual inspection

BAD Characters were unrecognizable as a result of visual inspection

Quantitative Evaluation of RGB by Cross-Sectional Observation Using Digital Microscope A piece was cut from the printed region, and a microtome was used to expose a cross-section of the printed region.

More specifically, from the characters "ABC123" printed as at FIG. 1, a sample was cut such that the total width of the portion corresponding to the leg of the "A" and the nonprinted (transparent) region was 1 cm, and such that the direction perpendicular thereto was 3 cm. Two-liquid-type epoxy adhesive (EP001N manufactured by Cemedine Co., Ltd.) was used to cause Ester Film (registered trademark) E5100-100 μm manufactured by Toyobo Co., Ltd., to adhere to the surface layer at either side of this sample to fabricate an embedded sample for cross-sectional observation. After using a microtome to slice off a cross-section from this embedded sample, an RH-2000 digital microscope manufactured by Hirox Co., Ltd., was used to observe the cross-section (the side of the sample that was 3 cm in length) and to respectively acquire RGB values from the printed region and nonprinted region. The software which was provided therewith was employed for RGB acquisition. The conditions under which observation was carried out were as follows

| | |
|---|---|
| Lens | MXB-5000REZ |
| Light source | High-luminance LED |
| | (color temperature 5700 K) |
| Magnification | 600x (MID range) |
| H visual field | 513.01 μm |
| Resolution | 0.27 μm |
| Brightness level | 100 (automatic) |
| Gamma correction | None |
| Color correction | 2 |
| Edge correction | 14 |
| White balance | Red 175; blue 128; green 142 |

When setting conditions under which observation was carried out, note that at least one among the RGB values at the printed region and the nonprinted region was made to be less than 200 but greater than 50 so as to permit the boundary between the printed region and the nonprinted region to be distinguished (so as to prevent brightness, white balance, and so forth within the visual field being observed from becoming extreme such as would cause overexposure or a completely black image). In the event that any among the RGB values is outside the foregoing range, because this would cause the conditions under which observation is carried out to be inappropriate, adjustment of brightness level, white balance, and/or the like must be carried out.

FIG. 2 shows a cross-sectional image of Working Example 1. Sample position was adjusted so as to permit simultaneous observation of the printed region and nonprinted region in a single image, and RGB values were acquired at 10 arbitrary points in each the printed region and the nonprinted region exclusive of the 100-μm boundary (at the central portion in FIG. 2) between the printed region and the nonprinted region. Formulas 4 and 5, below, were used to respectively calculate respective averages and standard errors for the RGB values that were obtained.

$$\text{Average}=(X_1+X_2+\ldots+X_n)/n \quad \text{Formula 4}$$

$$\text{Standard error}=s/(n^{1/2}) \quad \text{Formula 5}$$

$$\text{Standard deviation}=[\{(X_1-X_0)^2+(X_2-X_0)^2+\ldots+(X_n-X_0)^2\}/n]^{1/2}$$

$X_n$ = nth value
$X_0$ = Average
n = number of values (10)
s = Standard deviation Formulas 6 and 7, below, were used to respectively calculate the upper and lower limits of the 95% confidence interval for the respective values from the average and standard error that were obtained.

95% confidence interval upper limit = Average + standard error × 1.96    Formula 6

95% confidence interval lower limit = Average − standard error × 1.96    Formula 7

For the respective RGB values in the printed region and the nonprinted region, a significant difference was judged to exist when there was no overlap between the 95% confidence interval upper limit of the one and the 95% confidence interval lower limit of the other.

EXAMPLES

| R value at Working Example 1 → Significant difference | |
|---|---|
| Printed region | 95% confidence interval = 112.6 to 133.0 |
| Nonprinted region | 95% confidence interval = 164.0 to 179.2 |
| R value at Working Example 3 → No significant difference | |
| Printed region | 95% confidence interval = 138.9 to 170.1 |
| Nonprinted region | 95% confidence interval = 145.2 to 160.8 |

Laser Printing Layer Thickness

Thickness of printed region at laser printing layer in image used for cross-sectional observation that was obtained at the foregoing "Quantitative Evaluation of RGB by Cross-Sectional Observation" was measured. Software provided with RH-2000 digital microscope manufactured by Hirox Co., Ltd., was used for measurement.

TABLE 3

| | | | | | | Working Example 1 | Working Example 2 | Working Example 3 | Working Example 4 |
|---|---|---|---|---|---|---|---|---|---|
| Laminated constitution | Laser printing layer | | | | | Film 1 | Film 2 | Film 3 | Film 5 |
| | Sealing layer | | | | | Film 9 | Film 9 | Film 9 | Film 9 |
| | Other layers | | | | | — | — | Film 4 | — |
| Properties | Thickness [μm] | | | All layers | | 100 | 150 | 62 | 60 |
| | | | | Laser printing layer | | 63 | 108 | 18 | 27 |
| | Haze [%] | | | | | 30.9 | 36.7 | 23.1 | 11.4 |
| | Color L* | | | | | 88.2 | 90.1 | 90.4 | 93.2 |
| | Water vapor permeability [g/(m² · d)] | | | | | 23 | 10 | 0.2 | 4.6 |
| | Oxygen permeability [cc/(m² · d · atm)] | | | | | 60 | 4 | 0.4 | Measurement impossible |
| Evaluation of laser irradiation printing | Visual inspection | | | | | GOOD | GOOD | GOOD | GOOD |
| | RGB values at cross-section | Printed region | R value | Average | | 122.8 | 139.6 | 154.5 | 123.2 |
| | | | | Standard error | | 5.1 | 6.6 | 7.8 | 5.4 |
| | | | | 95% confidence interval | Upper limit | 133.0 | 152.8 | 170.1 | 134.0 |
| | | | | | Lower limit | 112.6 | 126.4 | 138.9 | 112.4 |
| | | | G value | Average | | 110.7 | 147.7 | 111.3 | 117.3 |
| | | | | Standard error | | 4.8 | 5.6 | 8.1 | 6.9 |
| | | | | 95% confidence interval | Upper limit | 120.4 | 158.9 | 127.5 | 131.1 |
| | | | | | Lower limit | 101.0 | 136.5 | 95.1 | 103.5 |
| | | | B value | Average | | 92.4 | 115.5 | 106.0 | 111.1 |
| | | | | Standard error | | 4.7 | 11.1 | 8.8 | 3.5 |
| | | | | 95% confidence interval | Upper limit | 101.9 | 137.7 | 123.6 | 118.1 |
| | | | | | Lower limit | 82.9 | 93.3 | 88.4 | 104.1 |
| | | Nonprinted region | R value | Average | | 171.6 | 167.0 | 153.0 | 168.4 |
| | | | | Standard error | | 3.8 | 5.5 | 3.9 | 0.7 |
| | | | | 95% confidence interval | Upper limit | 179.2 | 178.0 | 160.8 | 169.9 |
| | | | | | Lower limit | 164.0 | 156.0 | 145.2 | 166.9 |
| | | | G value | Average | | 175.2 | 169.0 | 149.4 | 171.3 |
| | | | | Standard error | | 4.2 | 3.7 | 3.4 | 1.5 |
| | | | | 95% confidence interval | Upper limit | 183.7 | 176.4 | 156.2 | 174.3 |
| | | | | | Lower limit | 166.7 | 161.6 | 142.6 | 168.3 |
| | | | B value | Average | | 176.8 | 161.6 | 169.9 | 159.8 |
| | | | | Standard error | | 3.6 | 4.6 | 2.8 | 1.2 |
| | | | | 95% confidence interval | Upper limit | 184.1 | 170.8 | 175.5 | 162.1 |
| | | | | | Lower limit | 169.5 | 152.4 | 164.3 | 157.5 |
| | | Significant difference was indicated for: | | | | R, G, B | R, G, B | G, B | R, G, B |

| | | | | | Working Example 5 | Comparative Example 1 | Comparative Example 2 | Comparative Example 3 |
|---|---|---|---|---|---|---|---|---|
| Laminated constitution | Laser printing layer | | | | Film 6 | Film 7 | Film 2 Film 2 | Film 8 |
| | Sealing layer | | | | Film 9 | Film 9 | Film 9 | Film 9 |
| | Other layers | | | | Film 4 | Film 4 | — | — |
| Properties | Thickness [μm] | | All layers | | 102 | 90 | 270 | 50 |
| | | | Laser printing layer | | 54 | — | 240 | 18 |
| | Haze [%] | | | | 17.5 | 7.5 | 45.5 | 18.6 |
| | Color L* | | | | 91.4 | 94.3 | 81.0 | 94.3 |
| | Water vapor permeability [g/(m² · d)] | | | | 0.2 | 0.2 | 2.1 | 25 |
| | Oxygen permeability [cc/(m² · d · atm)] | | | | 0.4 | 0.4 | 4.8 | 72 |

TABLE 3-continued

| Evaluation of laser irradiation printing | Visual inspection RGB values at cross-section | | | | | GOOD | BAD | BAD | BAD |
|---|---|---|---|---|---|---|---|---|---|
| | | Printed region | R value | Average | | 134.5 | 178.4 | 167.5 | 153.5 |
| | | | | Standard error | | 6.1 | 4.3 | 3.4 | 10.5 |
| | | | | 95% confidence interval | Upper limit | 146.7 | 187.0 | 174.3 | 174.5 |
| | | | | | Lower limit | 122.3 | 169.8 | 160.7 | 132.5 |
| | | | G value | Average | | 124.4 | 169.2 | 164.7 | 127.8 |
| | | | | Standard error | | 4.2 | 3.1 | 4.4 | 14.5 |
| | | | | 95% confidence interval | Upper limit | 132.8 | 175.4 | 173.5 | 156.8 |
| | | | | | Lower limit | 116.0 | 163.0 | 155.9 | 98.8 |
| | | | B value | Average | | 110.7 | 178.3 | 172.2 | 135.9 |
| | | | | Standard error | | 10.2 | 6.6 | 3.2 | 17.9 |
| | | | | 95% confidence interval | Upper limit | 131.1 | 191.5 | 178.6 | 171.7 |
| | | | | | Lower limit | 90.3 | 165.1 | 165.8 | 100.1 |
| | | Nonprinted region | R value | Average | | 181.4 | 174.6 | 164.7 | 165.7 |
| | | | | Standard error | | 4.6 | 2.3 | 3.6 | 3.8 |
| | | | | 95% confidence interval | Upper limit | 190.6 | 179.2 | 171.9 | 173.3 |
| | | | | | Lower limit | 172.2 | 170.0 | 157.5 | 158.1 |
| | | | G value | Average | | 154.4 | 167.3 | 157.9 | 159.4 |
| | | | | Standard error | | 3.6 | 1.5 | 7.2 | 8.2 |
| | | | | 95% confidence interval | Upper limit | 161.6 | 170.3 | 172.3 | 175.8 |
| | | | | | Lower limit | 147.2 | 164.3 | 143.5 | 143.0 |
| | | | B value | Average | | 159.8 | 168.4 | 165.5 | 158.5 |
| | | | | Standard error | | 5.6 | 4.7 | 6.1 | 7.2 |
| | | | | 95% confidence interval | Upper limit | 171.0 | 177.8 | 177.7 | 172.9 |
| | | | | | Lower limit | 148.6 | 159.0 | 153.3 | 144.1 |
| | | Significant difference was indicated for: | | | | R, G, B | Nothing | Nothing | Nothing |

Display Material Evaluation Results

The display materials at Working Examples 1 through 5 were all excellent in terms of the properties listed at TABLE 3, satisfactory results of evaluation having been obtained.

On the other hand, because Comparative Example 1 did not contain laser pigment, printing did not occur despite irradiation thereof by laser, and no significant difference in RGB values was indicated during cross-sectional observation.

Furthermore, although Comparative Example 2 contained laser pigment, as the laser printing layer was thick, being 240 μm in thickness, because haze in the nonprinted region exceeded 40%, printing could be recognized only with difficulty. It was also the case that no significant difference in RGB values was indicated during cross-sectional observation.

Although Comparative Example 3 contained laser pigment, because there was much variation in the blended ratios of raw materials during formation of the film that would become the laser printing layer, this caused the confidence intervals for RGB values in the printed region and the nonprinted region to overlap, making it difficult to distinguish printing.

INDUSTRIAL UTILITY

Because a display material in accordance with the present invention is of high transparency, and because printing in distinct fashion by a laser is permitted thereby, it is able to be favorably employed as a display material and a packaging.

The invention claimed is:

1. A display material having at least one layer permitting printing as a result of laser irradiation, the display material being such that the printing occurs due to change in color caused by the laser irradiation in at least one region of said layer; when a digital microscope is used to carry out cross-sectional observation of said printed region and a nonprinted region, a significant difference in at least any one of RGB values indicating color elements is observed; thickness of said printed region is not less than 5 μm but not greater than 200 μm; and the at least one layer permitting printing as a result of laser irradiation is a stretched film layer.

2. The display material according to claim 1 characterized in that thickness of the region in which the change in color occurs due to the laser irradiation is not less than 20 μm but not greater than 140 μm.

3. The display material according to claim 1 characterized in that not less than 100 ppm but not greater than 3000 ppm of pigment capable of causing the change in color due to the laser irradiation is present within the layer permitting the printing as a result of the laser irradiation.

4. The display material according to claim 3 characterized in that the pigment permitting the printing as a result of the laser irradiation contains metal, said metal being contained therewithin in the form of at least one species-whether alone or as an oxide-among bismuth, gadolinium, neodymium, titanium, antimony, tin, and aluminum.

5. The display material according to claim 1 characterized in that haze is not less than 1% but is not greater than 40%.

6. Packaging comprising the display material according to claim 1.

* * * * *